(12) United States Patent
Rohrberg et al.

(10) Patent No.: US 6,546,960 B1
(45) Date of Patent: Apr. 15, 2003

(54) SELF-ALIGNING SMARTSTRATE™

(75) Inventors: Roderick G. Rohrberg; Timothy K. Rohrberg, both of Torrance; Jon W. Vollmer, Long Beach, all of CA (US)

(73) Assignee: Creative Pathways, Inc., Torrance, CA (US)

( * ) Notice: Subject to any disclaimer, the term of this patent is extended or adjusted under 35 U.S.C. 154(b) by 0 days.

(21) Appl. No.: 09/903,869

(22) Filed: Jul. 11, 2001

Related U.S. Application Data

(63) Continuation-in-part of application No. 09/518,845, filed on Mar. 3, 2000, now abandoned.

(51) Int. Cl.⁷ .................................................. F16L 39/00
(52) U.S. Cl. ..................................... 137/884; 285/125.1
(58) Field of Search ................................ 137/884, 269; 285/125.1, 368; 251/367

(56) References Cited

U.S. PATENT DOCUMENTS

| | | | | |
|---|---|---|---|---|
| 4,934,411 A | * | 6/1990 | Albrecht ..................... 137/884 |
| 5,232,007 A | * | 8/1993 | Martin ......................... 137/15 |
| 5,860,676 A | * | 1/1999 | Brzezicki et al. ............. 285/24 |
| 5,988,696 A | * | 11/1999 | Ruppert .................... 285/123.1 |
| 6,012,479 A | * | 1/2000 | Fukushima et al. ......... 137/271 |
| 6,056,330 A | * | 5/2000 | Compton et al. ........... 285/337 |
| 6,125,887 A | * | 10/2000 | Pinto .......................... 137/884 |
| 6,374,859 B1 | * | 4/2002 | Vu et al. ..................... 137/884 |

* cited by examiner

*Primary Examiner*—John Fox
(74) *Attorney, Agent, or Firm*—Thomas N. Giaccherini

(57) ABSTRACT

A Self-Aligning SmartStrate™ for providing reliable, self-aligning connections to external fluid-handling or fluid-sensing components is disclosed. One embodiment comprises a generally rectilinear body (102) that includes a plurality of exterior side walls (103). One of the exterior side walls (103) has a weld extension (106B) which may be welded to an external tube. The upper wall (104) has a port (108) which is configured to connect to an external component. The rectilinear body (102) has at least one internal passageway (107) which runs from the weld extension (106B) to the port (108). The rectilinear body (102) does not require holes or fasteners that fit into holes, since it employs a number of posts (110) that project from the body (102) to secure the body (102) to an external component.

25 Claims, 26 Drawing Sheets

Single Sided
Self Aligning Assembly

Single Sided Self Aligning Assembly

Single Sided
Self Aligning Assembled

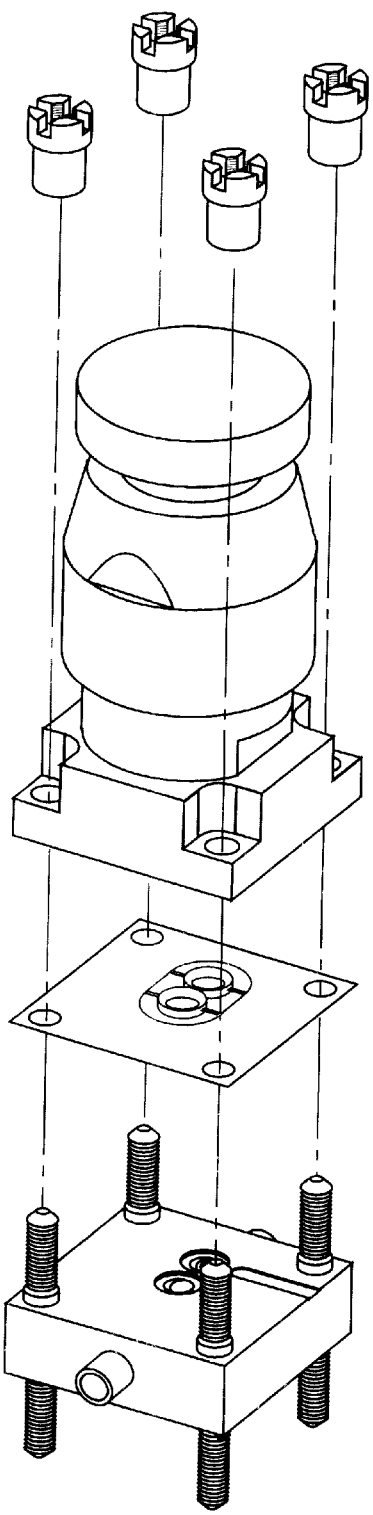 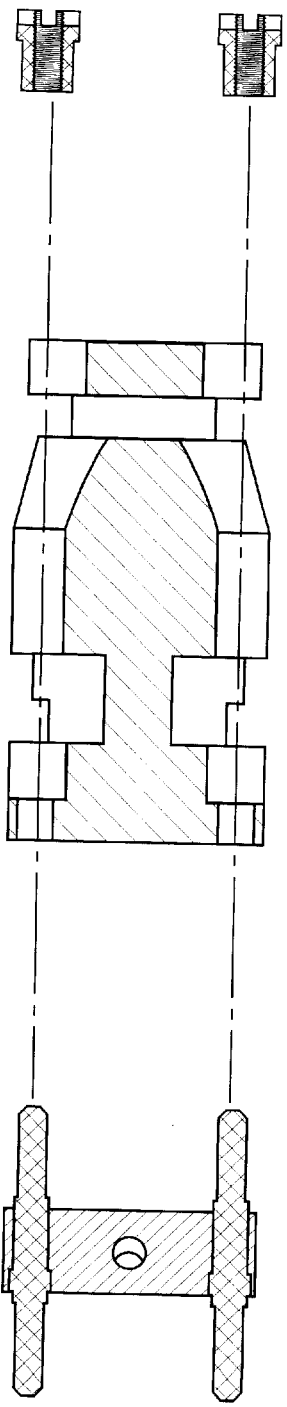
Fig. 5 Double Sided Self Aligning Assembly Fig. 6

Double Sided
Self Aligning Assembled

Fusion Weld Joint Design
Double Sided Individual Multi-Port Gas Blocks

Fusion Weld Joint Design
Single Sided Individual Multi-Port Gas Blocks

One In Three Out Gas Manifold
Single Sided Individual Multi-Ported Gas Blocks

Single Sided
Self Alignment & Fastening Pin

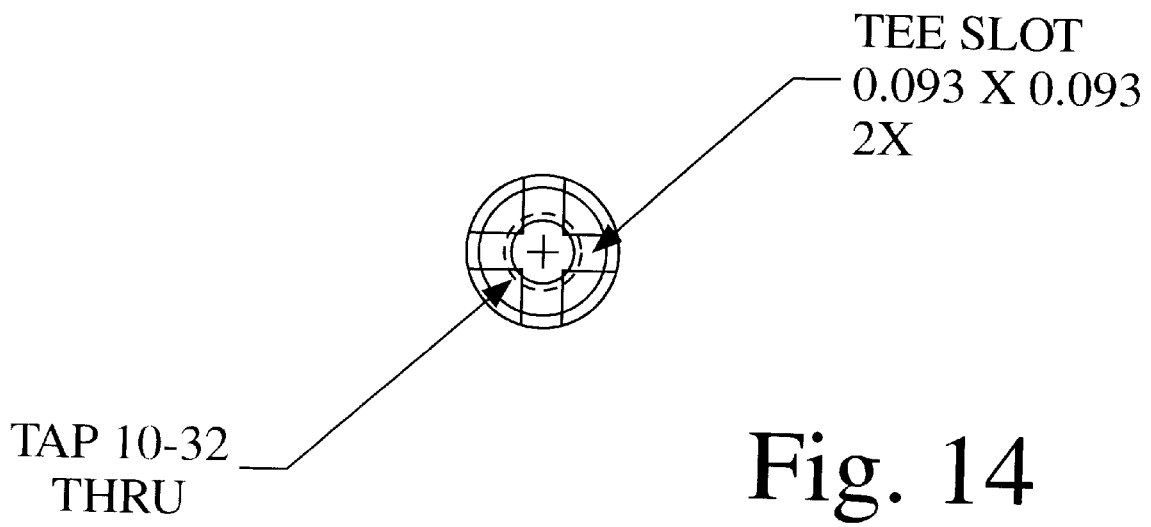
Fig. 14
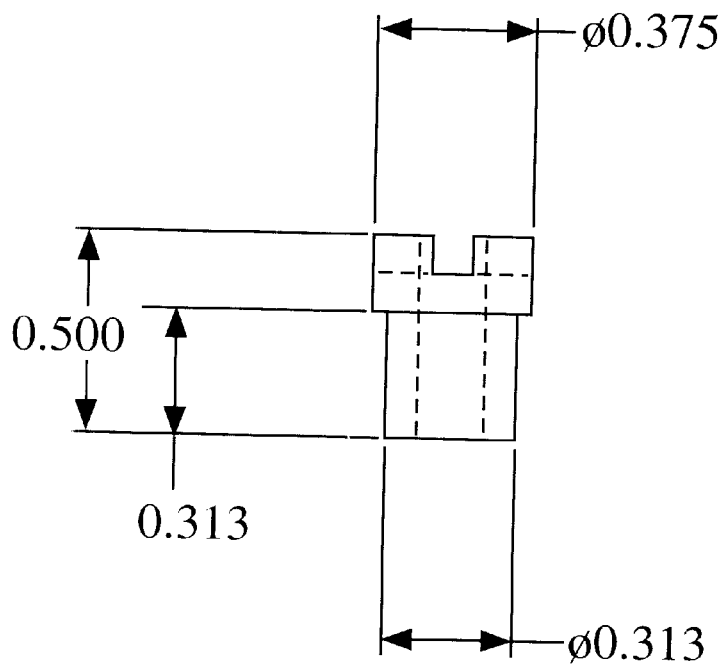
Self Aligning Nut

Double Sided
Self Alignment & Fastening Pin

Double Sided Alignment & Fastening Pin

C-Seal

Tack Weld
4X

C-Seal

Tack Weld 4X

"C" Seal

Nut

Thread

Double Sided Studs

Single Side Stud

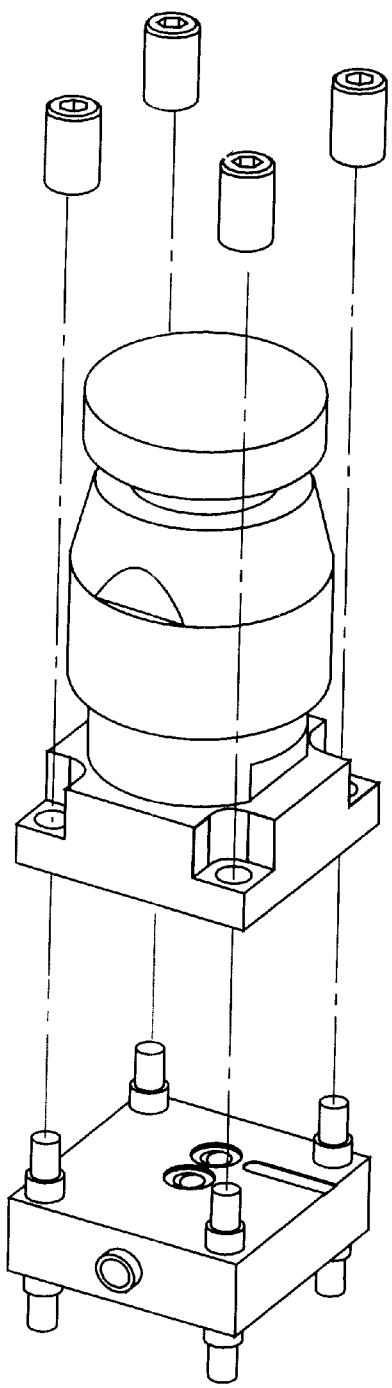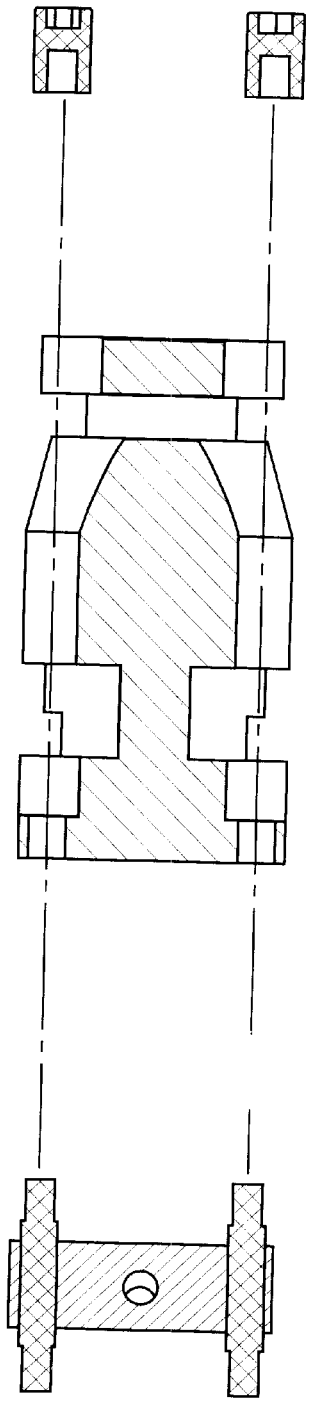
Fig. 20
Fig. 21

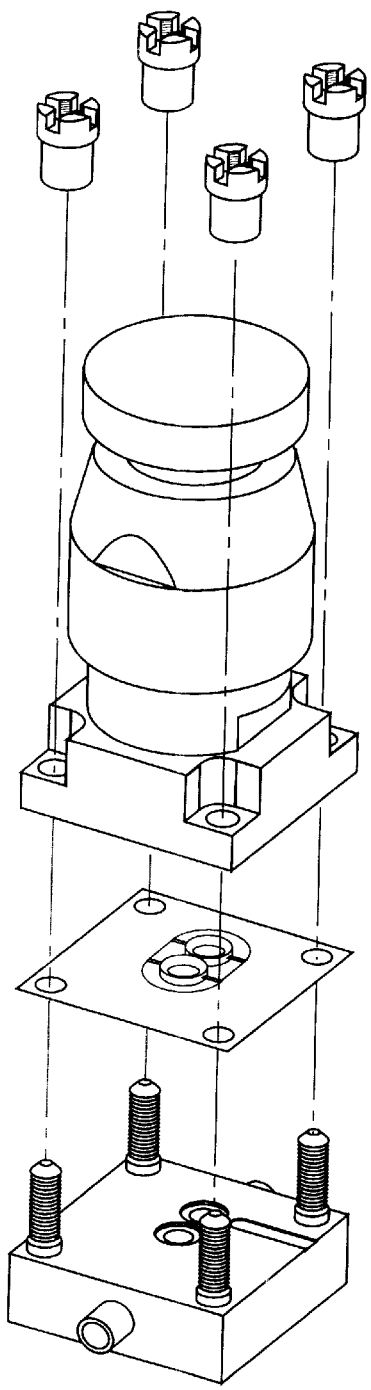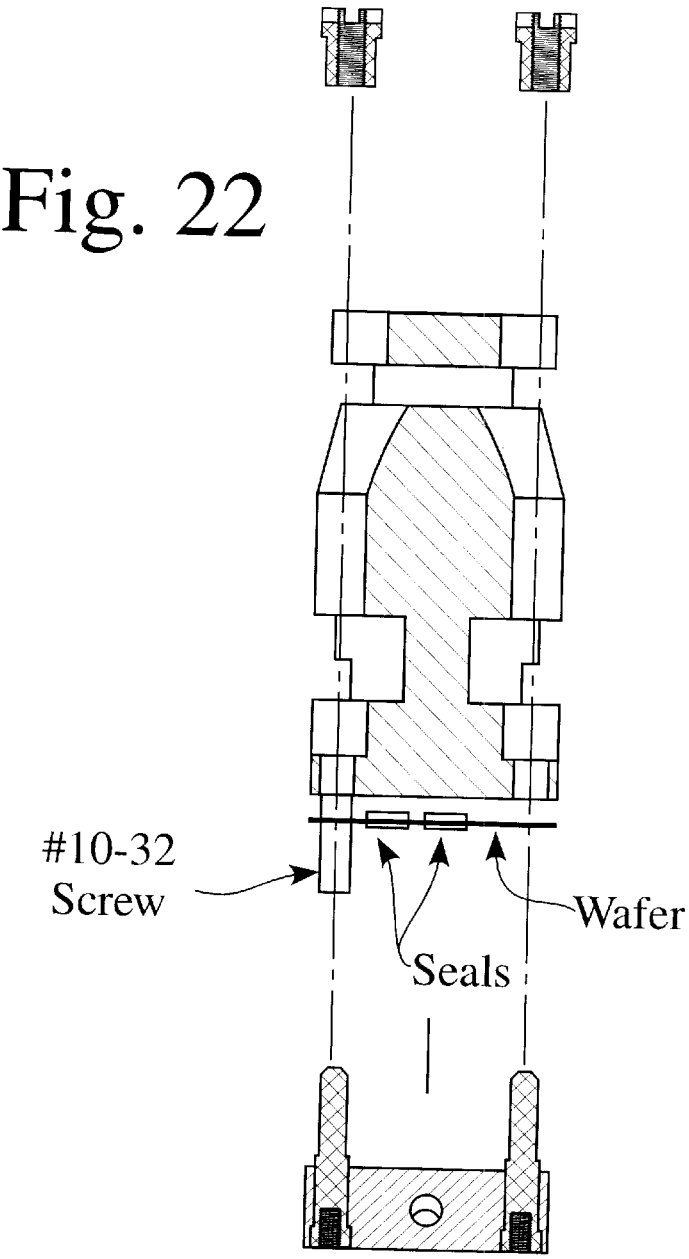
Fig. 22
10-32 Screw
Wafer
Seals
Single Sided
Self Aligning Assembly

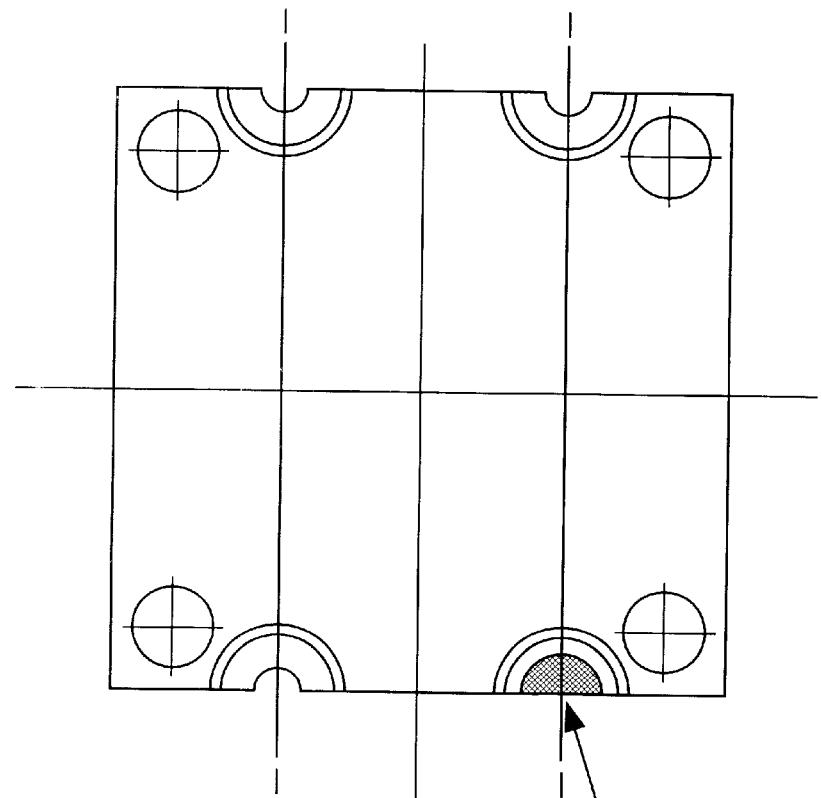
Fig. 23
Weld Nugget
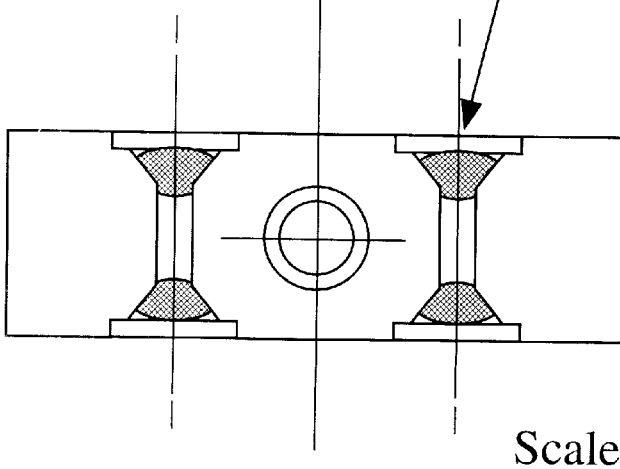
Scale 2X

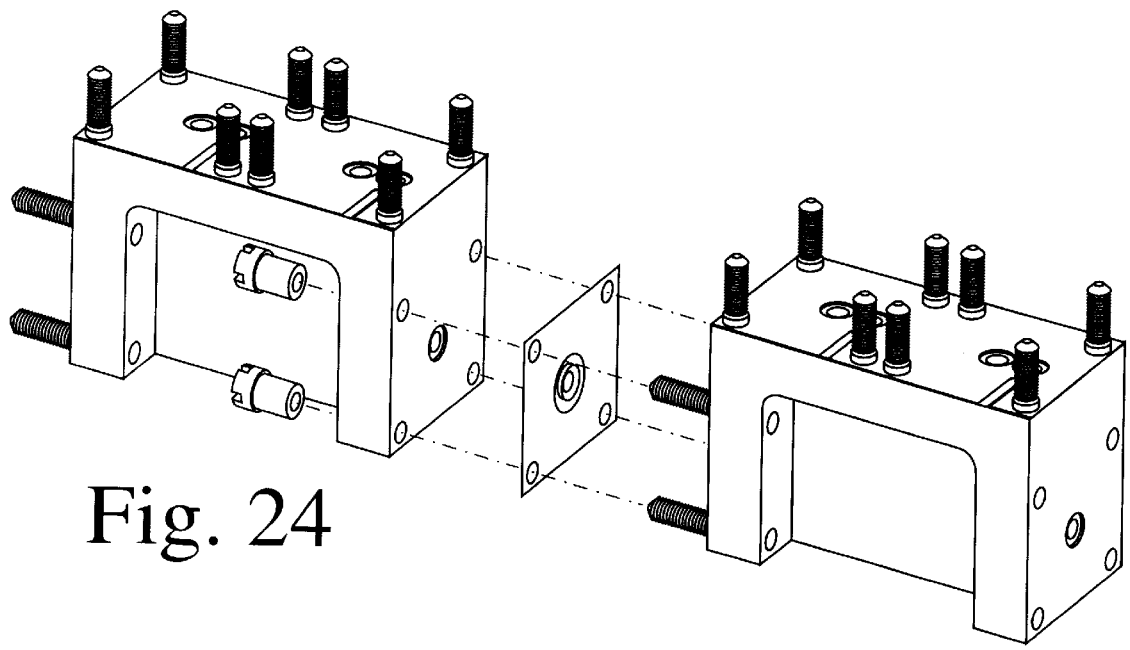
Fig. 24
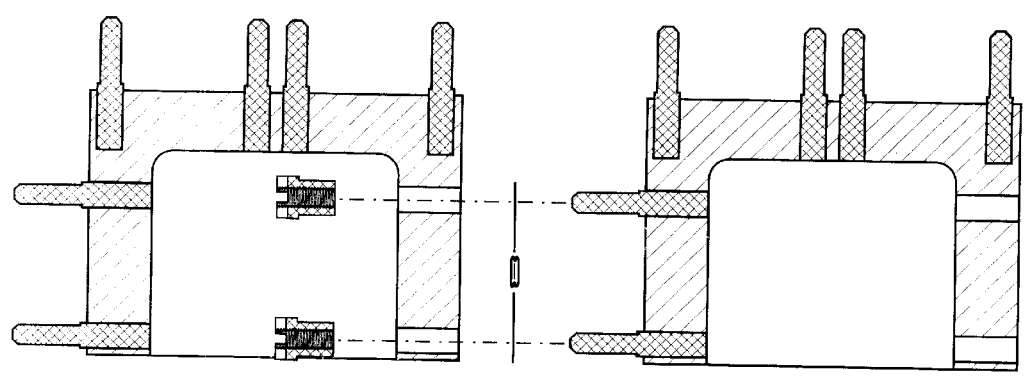
2 Place Mono-Block
Self Aligning Assembly   Fig. 25

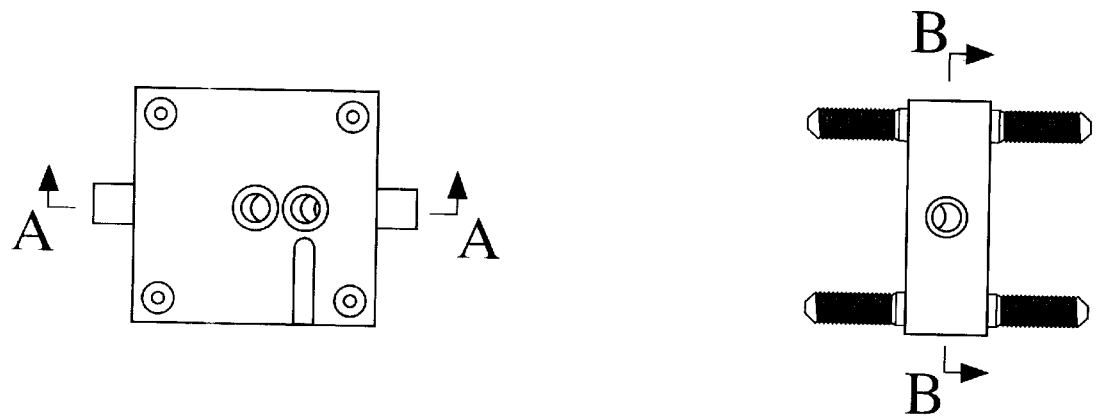
Fig. 26
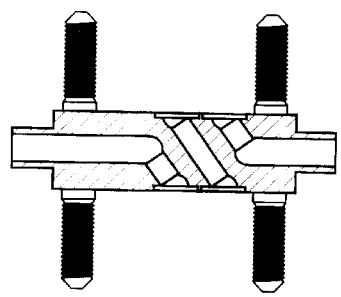
SECTION A-A
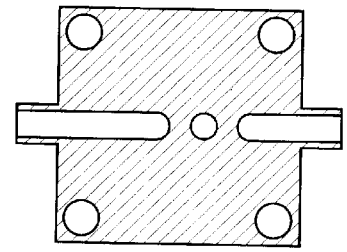
SECTION B-B
Double Sided
Self Aligning Gas Block

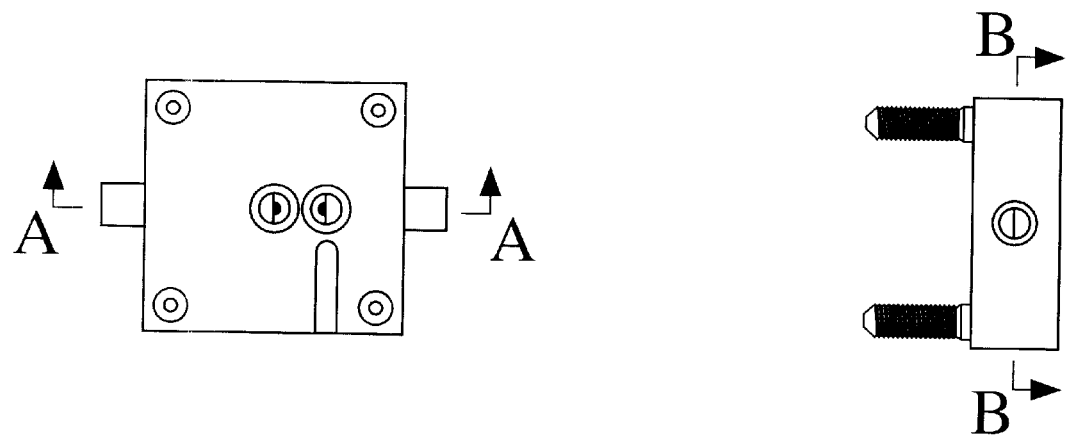
Fig. 27
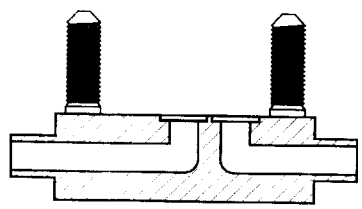
SECTION A-A
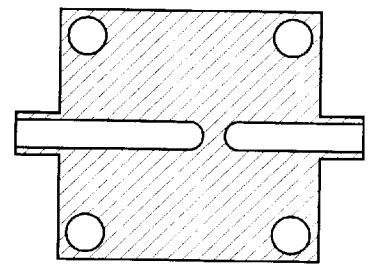
SECTION B-B
Single Sided
Self Aligning Gas Block Single Sided
Self Aligning Gas Block

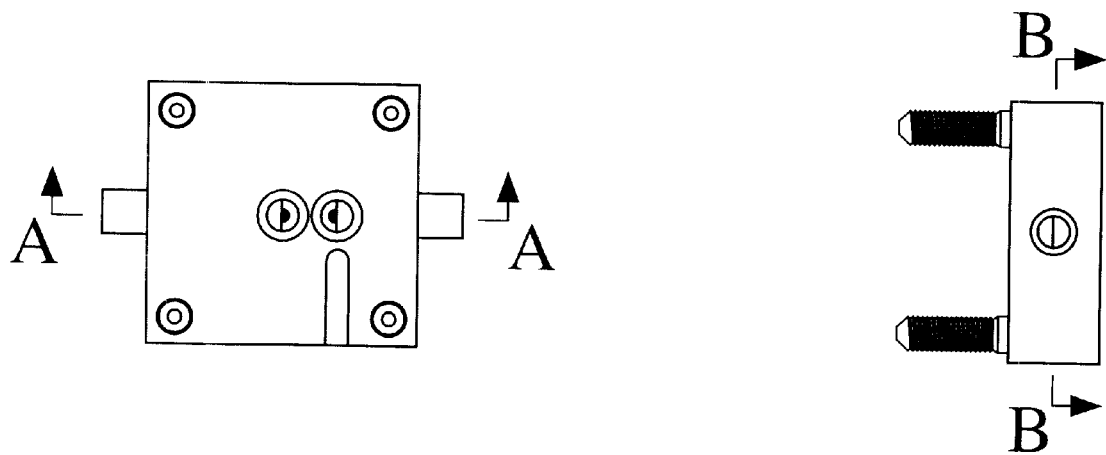
Fig. 29
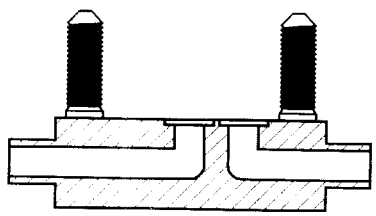
SECTION A-A
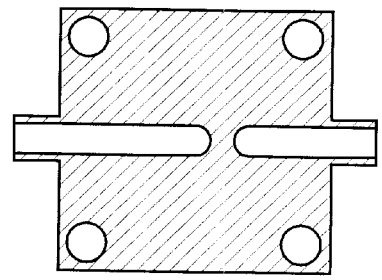
SECTION B-B
Single Sided
Self Aligning Gas Block

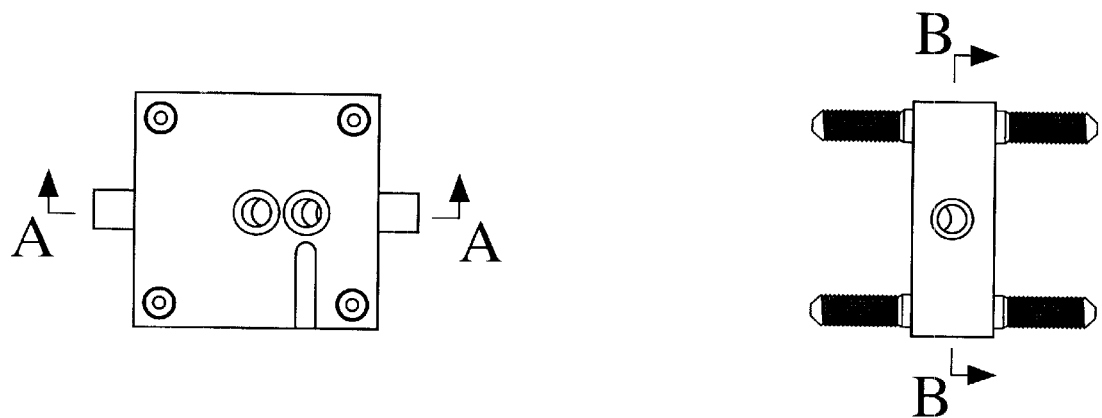
Fig. 30
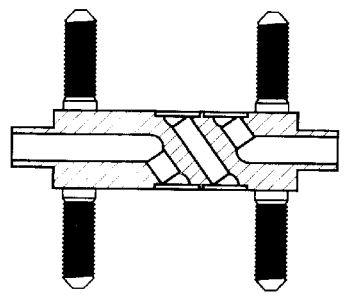
SECTION A-A
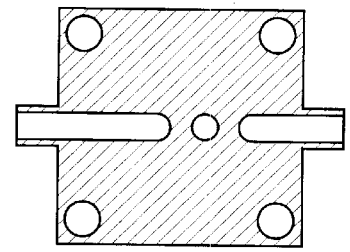
SECTION B-B
Double Sided
Self Aligning Gas Block Single Sided Self Aligning Gas Blocks Double Sided
Self Aligning Gas Block C-Seal Tack Weld 4X Fusion Weld Joint Design
Single Sided Individual Multi-Port Gas Blocks

SELF-ALIGNING SMARTSTRATE™

CROSS-REFERENCES TO RELATED U.S. PATENT APPLICATIONS & U.S. PATENTS

The present Patent Application is a Continuation-in-Part Application. The Applicants claim the benefit of priority for any subject matter which is shared by the present Application, and by a parent Patent Application entitled High Precision Fluid Coupler which was filed on Mar. 3, 2000, and which was assigned U.S. Ser. No. 09/518,845 now abandoned. On Jun. 8, 2001, the Applicants filed a Request for a Continuing Prosecution Application for Ser. No. 09/518,845. The Invention described and claimed below is also related to earlier Inventions disclosed in U.S. Pat. No. 5,440,477 entitled Modular Bottle-Mounted Gas Management System by Roderick G. Rohrberg et al., issued on Aug. 8, 1995, and in U.S. Pat. No. 5,794,645 entitled Method for Supplying Industrial Gases Using Integrated Bottle Controllers by Roderick G. Rohrberg et al., issued on Aug. 18, 1998.

FEDERALLY SPONSORED RESEARCH OR DEVELOPMENT

None.

FIELD OF THE INVENTION

The present invention is a self-aligning miniature fluid coupling device for welding individual components, connectors, fittings, tubes, conduits, and manifolds. Although the invention is primarily intended for providing connections between lines that convey fluids including gases and liquids, it may also be utilized in situations where tubes are employed to house or shield electrical cables or optical fibers. Another application of the invention is as a miniature sensor that is coupled to a fluid line for registering temperature, pressure, flow-rates, or other physical measurements.

The Self-Aligning SmartStrate™ provides extremely reliable, self-aligning assembly procedure of a fluid coupler and an external component through the use of novel integrally-formed alignment posts, and is easily joined without separate, manually installed threaded screws. These self-aligning, pre-formed posts are a permanent part of the body of coupler, and eliminate the risk of damage to the seals that are employed to ensure a leak-proof coupling between the fluid coupler and an external component. The invention works with other miniaturized fittings, insures design flexibility and manufacturing simplicity, and has the additional advantages of being lighter and less costly than conventional hardware.

BACKGROUND OF THE INVENTION

Many industries, including the semiconductor industry, use coupling hardware to connect gas lines and components in complex fabrication equipment. Previous connectors that have been incorporated into chip fabrication systems have served the needs of semiconductor manufacturers adequately, but at a high cost in terms of inconvenience and unacceptably high rates of failure. Conventional fluid fittings can be unreliable, especially if the seals which are used to join these fittings to other devices are mis-aligned or have been damaged due to improper installation. The high temperatures and pressures of the gases and liquids transported within these fittings and assemblies can eventually cause a breach of a seal, resulting in a leak that either contaminates the fluid within the line or in a dangerous loss of chemicals to the outside environment.

The Invention described and claimed below is related to earlier Inventions disclosed in U.S. Pat. No. 5,440,477 entitled Modular Bottle-Mounted Gas Management System by Roderick G. Rohrberg et al., issued on Aug. 8, 1995, and in U.S. Pat. No. 5,794,645 entitled Method for Supplying Industrial Gases Using Integrated Bottle Controllers by Roderick G. Rohrberg et al., issued on Aug. 18, 1998.

Previous attempts to provide fluid couplers and welding connectors have yielded mixed results. The Nupro Company of Willoughby, Ohio offers a variety of fittings identified by the Swagelok® Trade Mark. These fittings include substrates, manifold bases, end caps, bridges, surface-mounted diaphragms, bellows metering valves, seals and assembly hardware.

In U.S. Pat. No. 6,125,887, which was issued on Oct. 3, 2000 to James V. Pinto, discloses Welded Interconnection Modules for High Purity Fluid Flow Control Applications. Pinto generally claims "a rectangular metal modular block for directing fluid flow therethrough." (Preamble of Claim 1, Column 5, Lines 30–31.) Pinto further recites limitations concerning a "plurality (sic) of holes receiving fasteners for securing said component to said block" (Claim 1, Column 6, Lines 5–6) and a "plurality of holes receiving fasteners securing at least one said fluid control component to each said block" (Claim 4, Column 6, Lines 20–22). Pinto's Claims require the inclusion of holes that have been pre-formed and tapped in the body of coupler. Pinto's Claims also require that these tapped holes receive separate fasteners which must be manually installed to connect the body of his device to a block or component. This manual installation is fraught with the risk of mis-aligning the fasteners, stripping their threads, damaging seals or producing a coupling to an external component which is not leak-proof.

The shortcomings of conventional fluid couplers and gas control devices has presented a major challenge to designers in the field of industrial controls. The development of a self-aligning miniaturized, safe, and clean fluid coupler would constitute a major technological advance. The enhanced performance that could be achieved using such an innovative device would satisfy a long felt need within the semiconductor fabrication and fluid handling industries.

SUMMARY OF THE INVENTION

The present invention, the Self-Aligning SmartStrate™ provides a radically new, self-aligning fluid coupler which dispenses with the need for separate hand-installed threaded screws. One preferred embodiment comprises a generally rectilinear body having exterior side walls, an upper wall and a lower wall. One or more of the exterior walls may include a side wall port or a weld extension for making connections to external lines. Both these ports and extensions lead into the body, and may connect through an internal passageway to a port that may be located on an upper wall. In a preferred embodiment, the body also includes four pre-formed, integral, self-aligning pins or posts that may be used to connect an external device, block or component to the body. A thin foil sheet that includes alignment holes and "C-seals" is installed between the body and the external device, which is secured in place by a set of retainers that engage the posts.

In one embodiment of the invention, the seal is first installed by aligning the four holes in the sheet bearing the seal with the alignment posts that extend from the body of the coupler. The foil sheet serves as a "seal positioner" which holds the seals in the proper location. The seal is properly aligned when the foil sheet is positioned over the posts. By holding the seal in the correct alignment and location, the seal-positioning sheet avoids any unwanted motion, deflection or translation of the seal. Once the seal is properly installed by sliding the seal all the way down so that the seal is in contact with the upper wall of the body, the alignment posts are mated with a corresponding set of holes on an external component. Finally, a set of retainers such as nuts are used to lock the external component to the fluid coupler.

Due to the novel design of the present invention, the correct alignment of the coupler, the seal and the external component does not depend on the skill of the assembler, since no separate screws are required to manually couple the body to an external component. The integrity of the seal and the physical connection between the body and the external component are assured by this self-aligning feature. The present invention provides quality assurance, along with simplicity in installation. The invention also provides for the automatic registration and alignment of the body and the external component.

An appreciation of other aims and objects of the present invention and a more complete and comprehensive understanding of this invention may be achieved by studying the following description of a preferred embodiment, and by referring to the accompanying drawings.

A BRIEF DESCRIPTION OF THE DRAWINGS

FIGS. 1 & 2 present exploded side and cut-away views of one embodiment of a single-sided self-aligning substrate.

FIGS. 3 & 4 present perspective and cut-away views of the assembled self-aligning substrate shown in FIGS. 1 & 2.

FIGS. 5 & 6 present exploded side and cut-away views of one embodiment of a double-sided self-aligning substrate.

FIGS. 7 & 8 present perspective and cut-away views of the assembled self-aligning substrate shown in FIGS. 5 & 6.

Figure 12A:
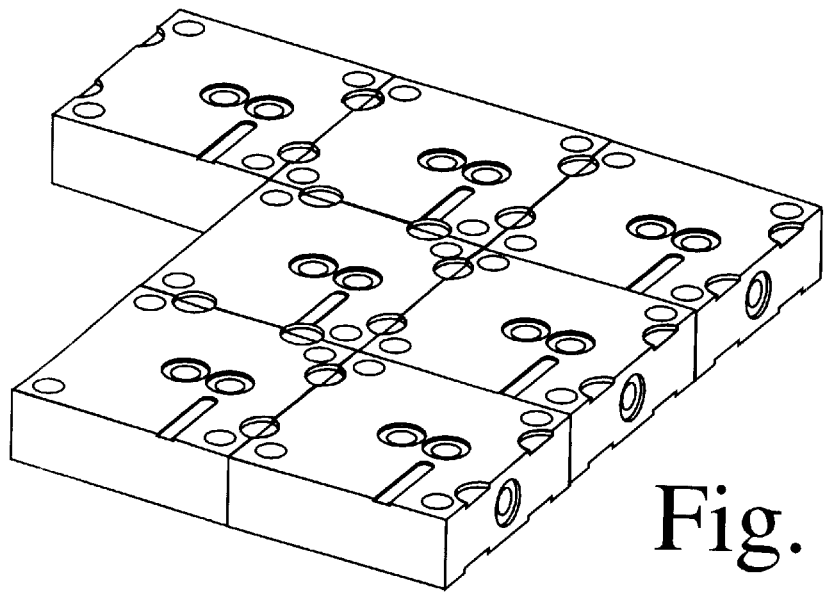
Figure 12B:
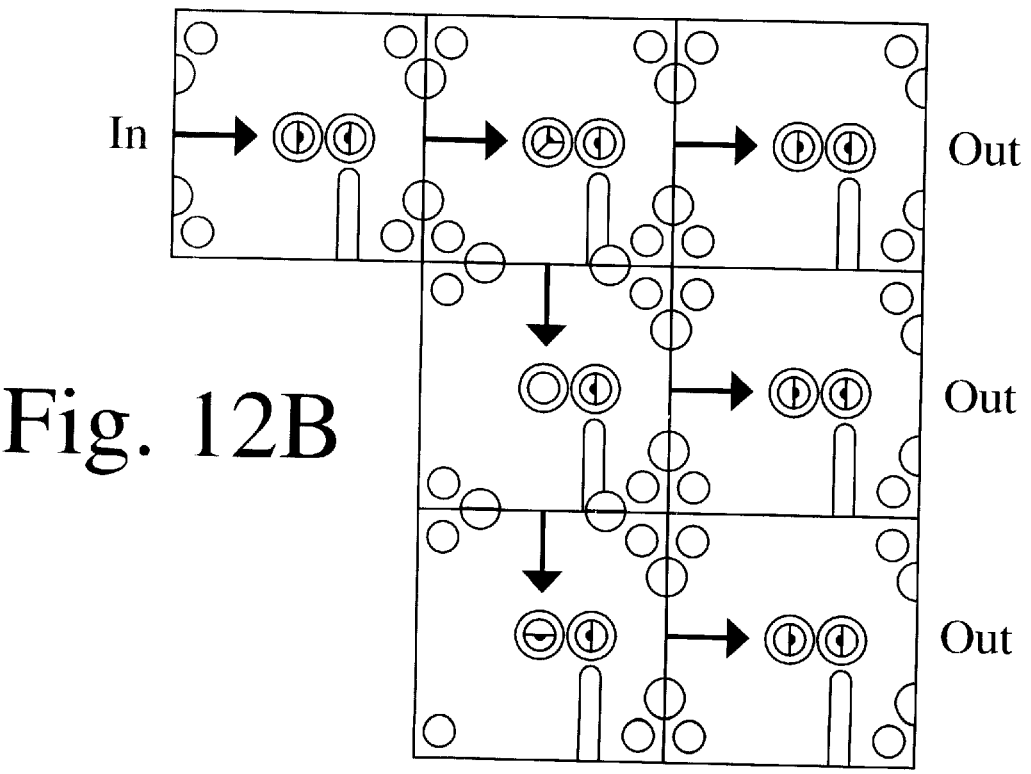

FIGS. 12A & 12B offer views a gas manifold that includes single sided multi-ported gas blocks.

Figure 13:
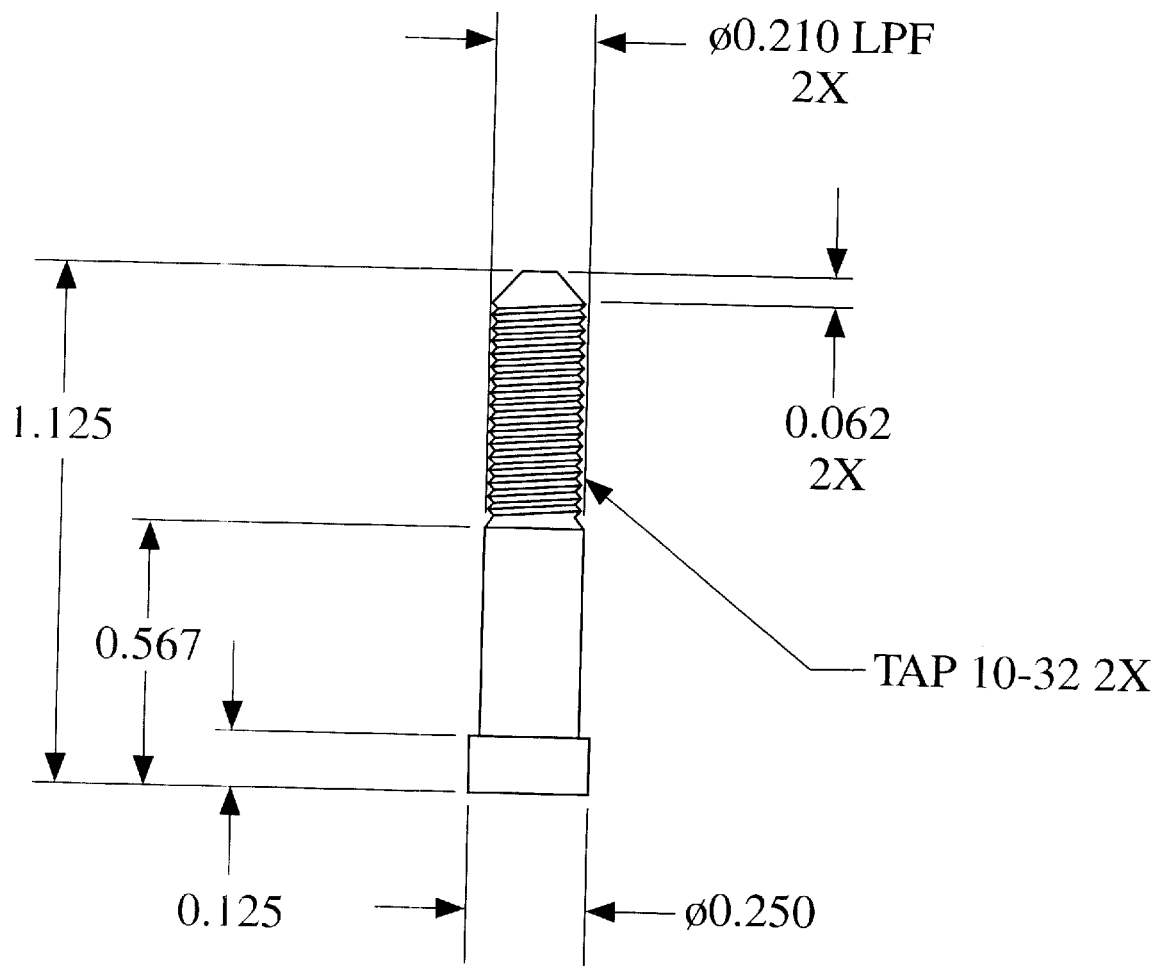

FIGS. 13 & 14 illustrate single-sided self-alignment and fastening pin and nut.

Figure 15:
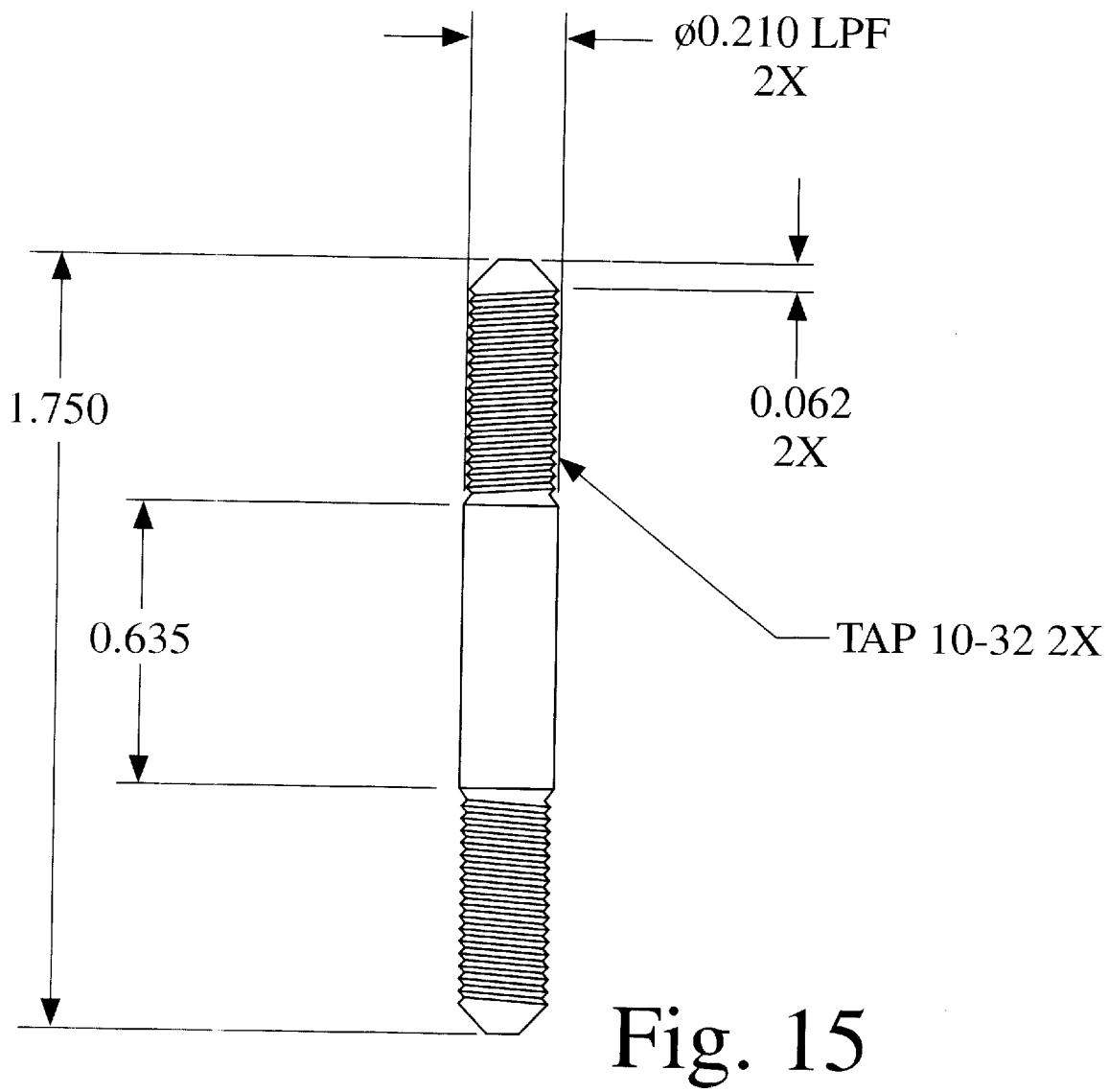
Figure 16:
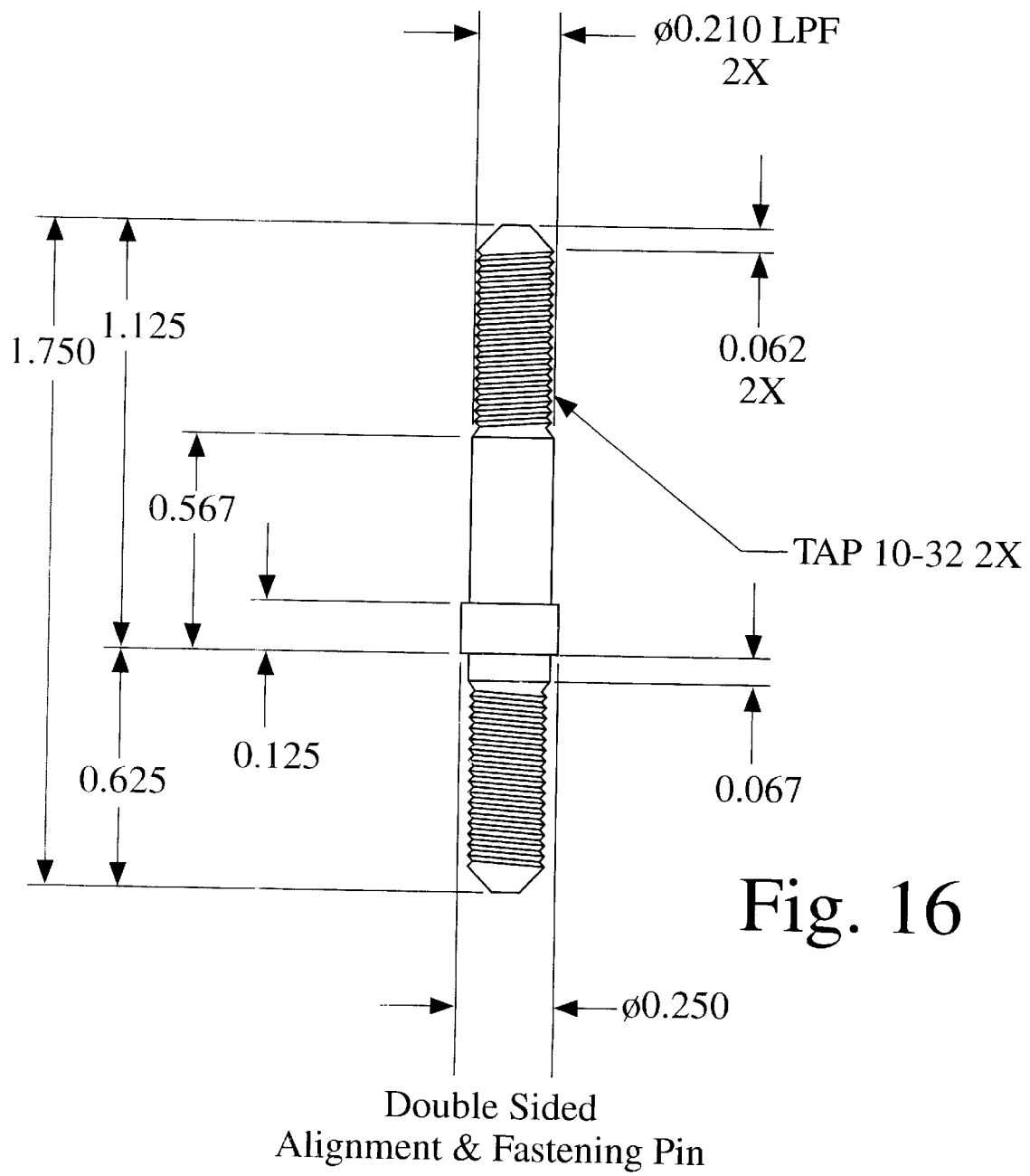
Figure 17A:
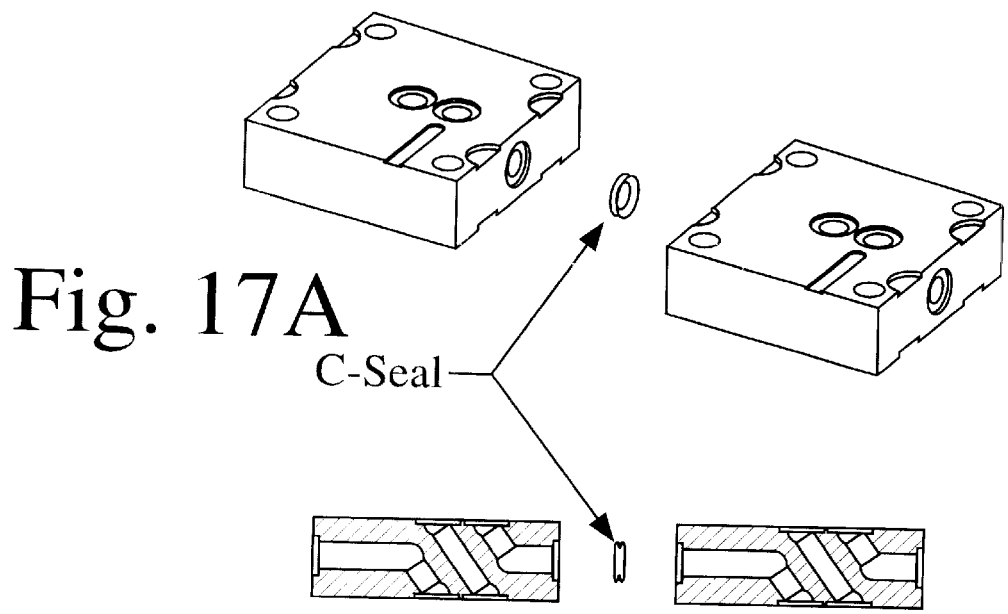
Figure 17B:
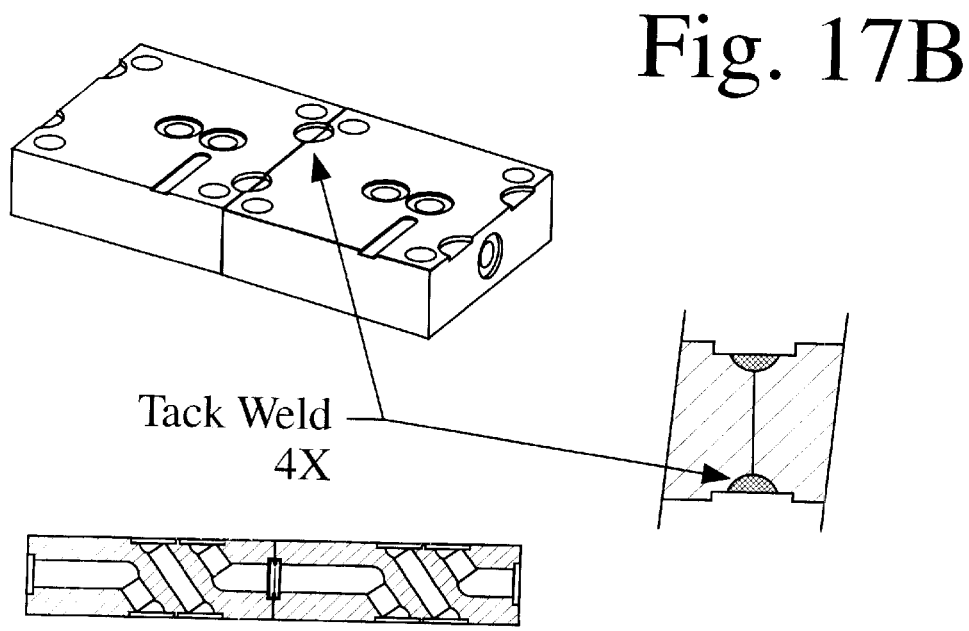
Figure 18A:
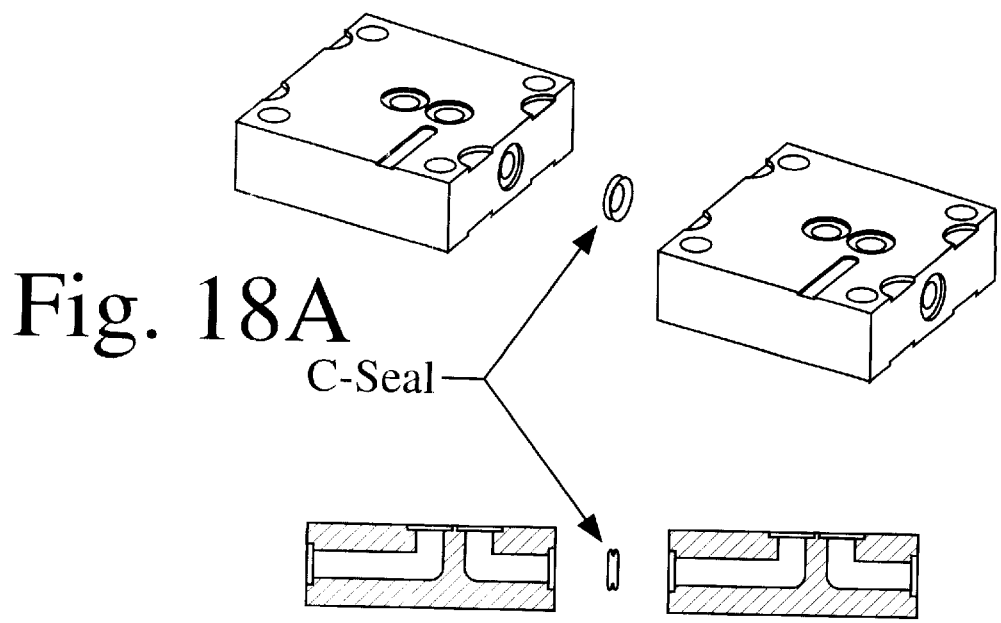
Figure 18B:
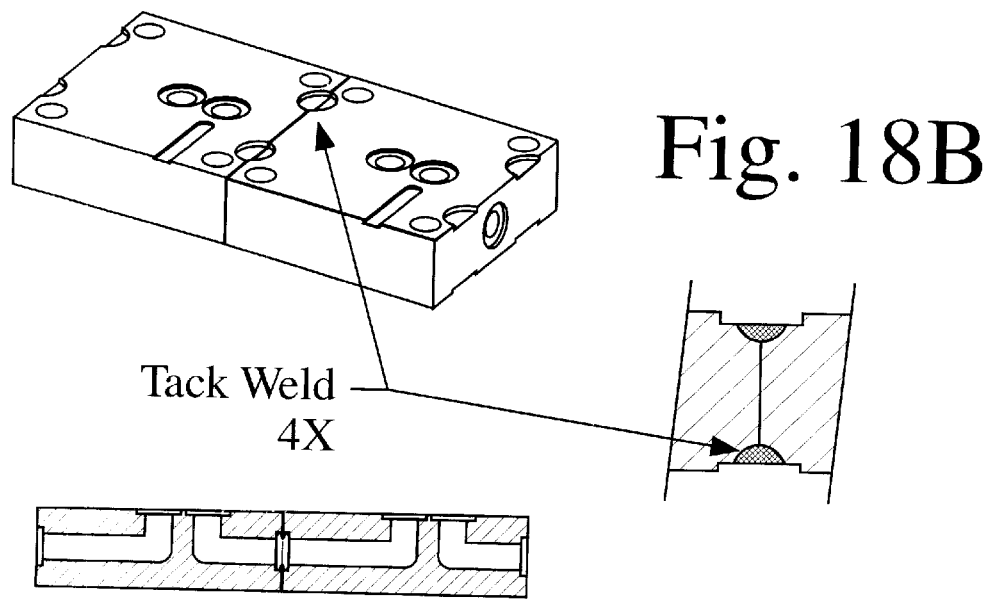
Figure 19A:
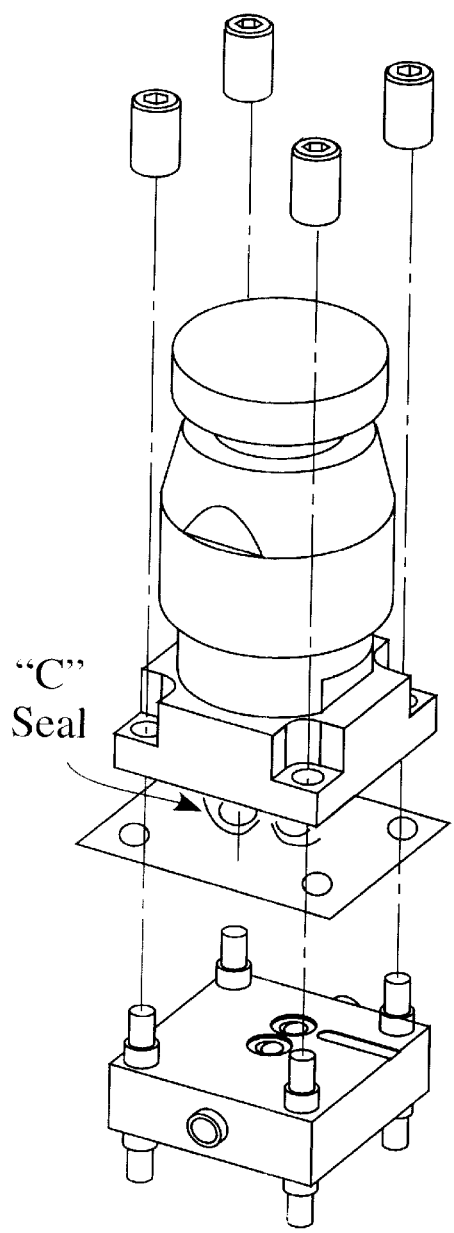
Figure 19B:
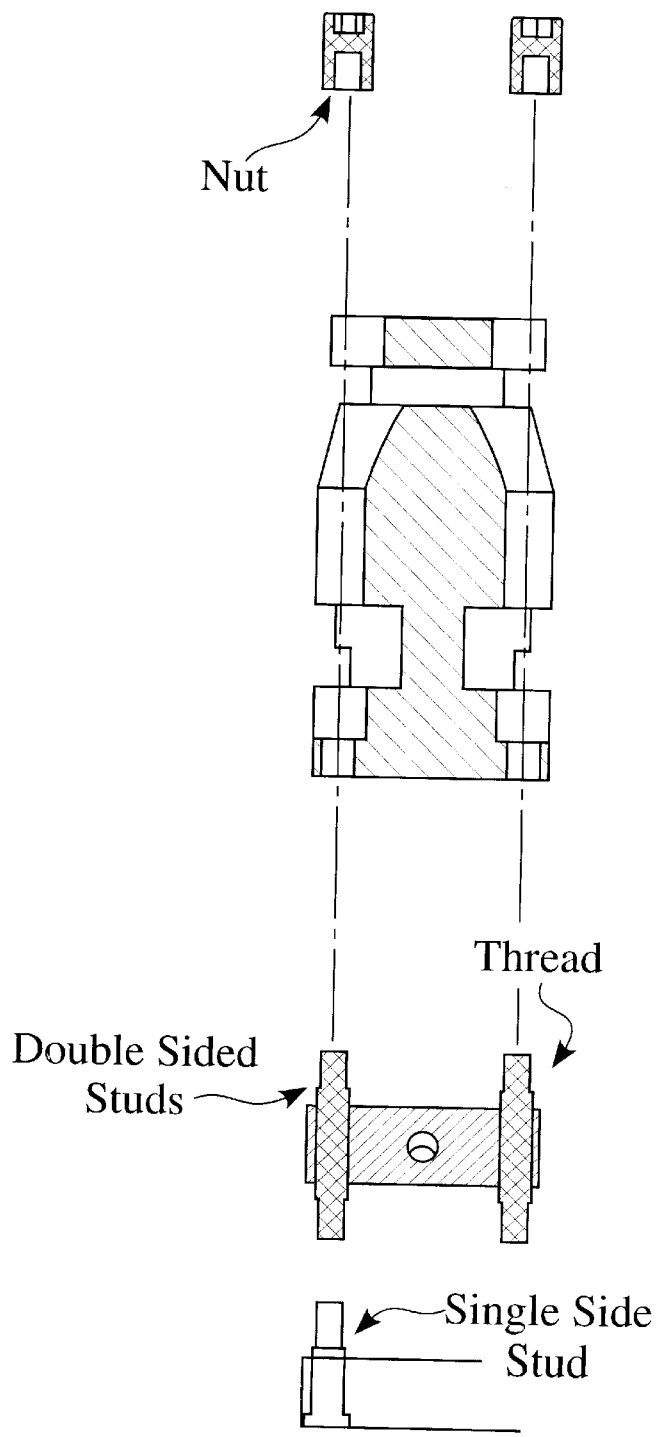

FIGS. 15 & 16 illustrate double-sided self-alignment and fastening pins.

FIGS. 17A, 17B, 18A & 18B portray perspective and cut-away views of fluid couplers.

FIGS. 19A, 19B, 20 & 21 depict embodiments of the invention that utilize a self-aligning studs.

FIG. 22 presents perspective and cut-away views of one embodiment of the present invention.

FIG. 23 provides overhead and cut-away views of weld nuggets that are employed to join individual blocks.

FIGS. 24 and 25 offer perspective and cut-away views of a mono-block self-aligning assembly.

FIG. 26 furnishes several views of a double-sided self-aligning gas block.

Figure 28:
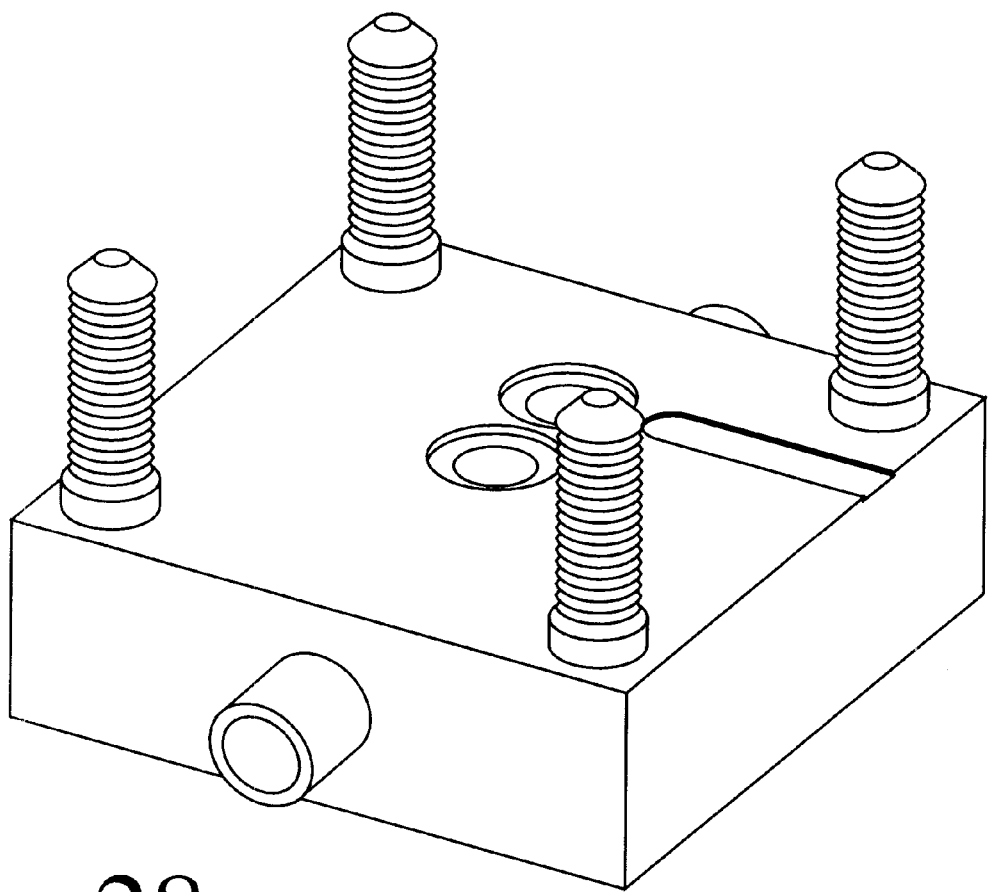

FIGS. 27, 28 and 29 furnish several views of a single-sided self-aligning gas block.

FIG. 30 supplies additional views of a double-sided self-aligning gas block.

Figure 31:
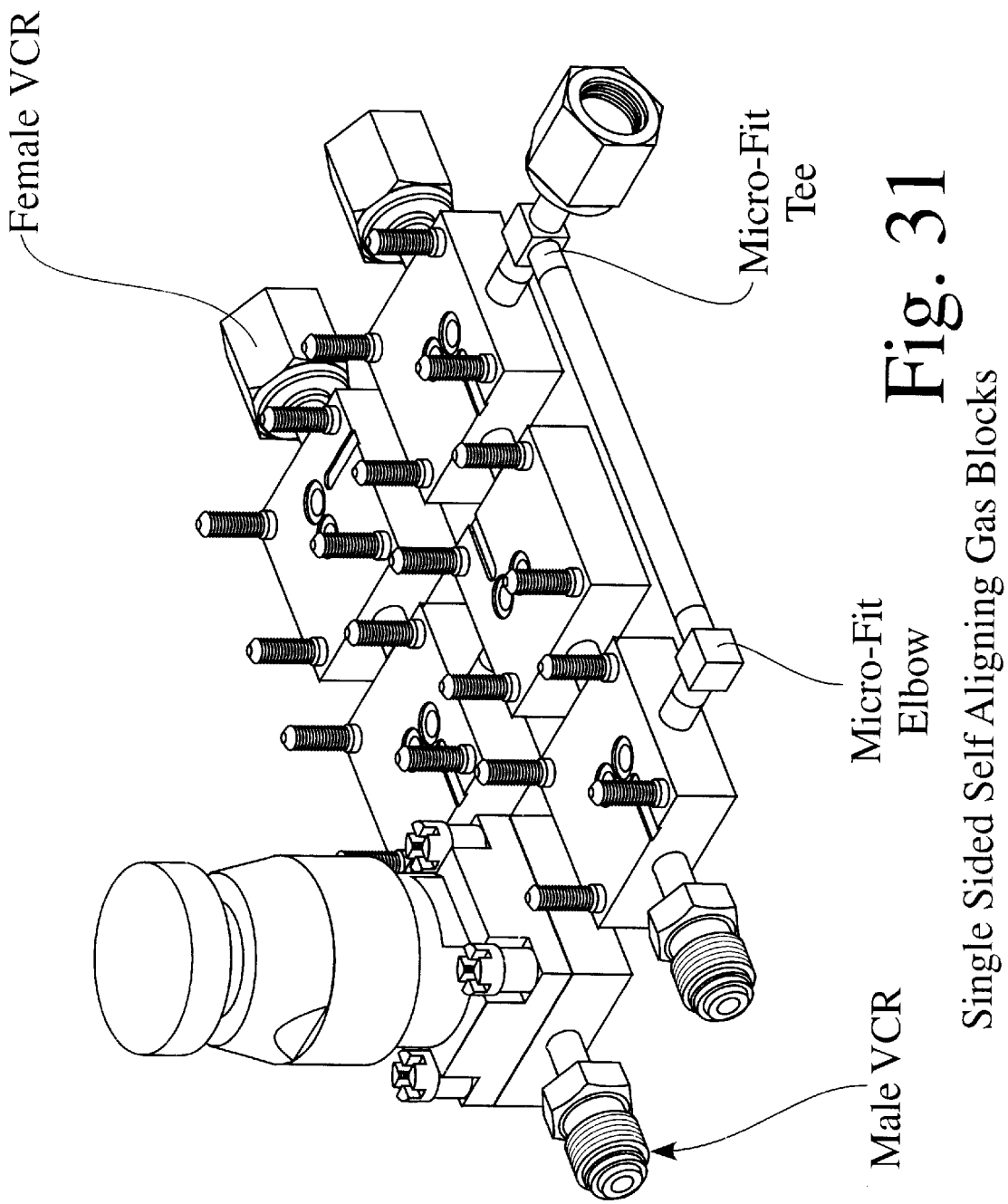

FIG. 31 depicts an array of single-sided self-aligning gas blocks.

Figure 32:
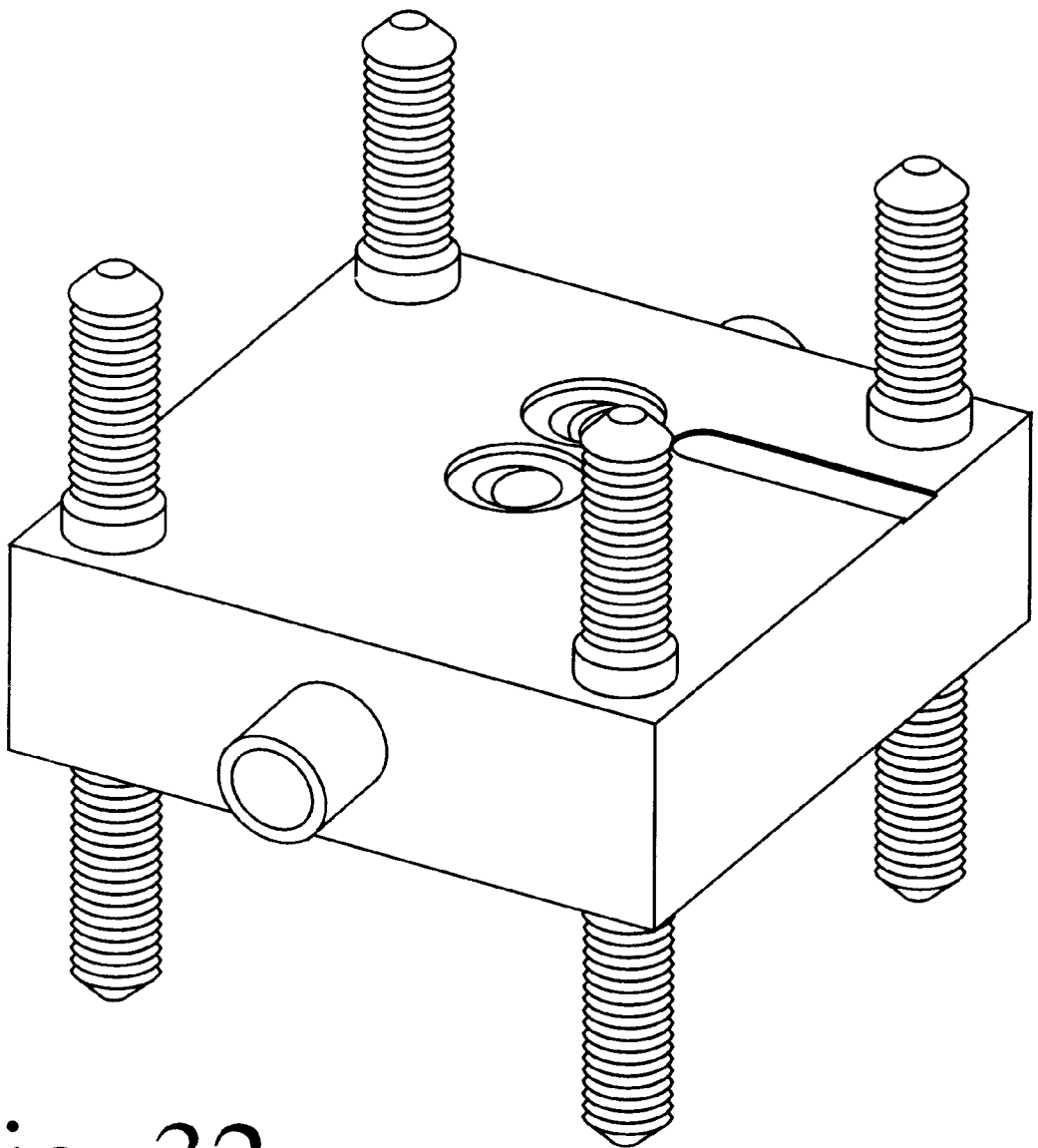

FIG. 32 portrays a double-sided self-aligning gas block.

Figure 33:
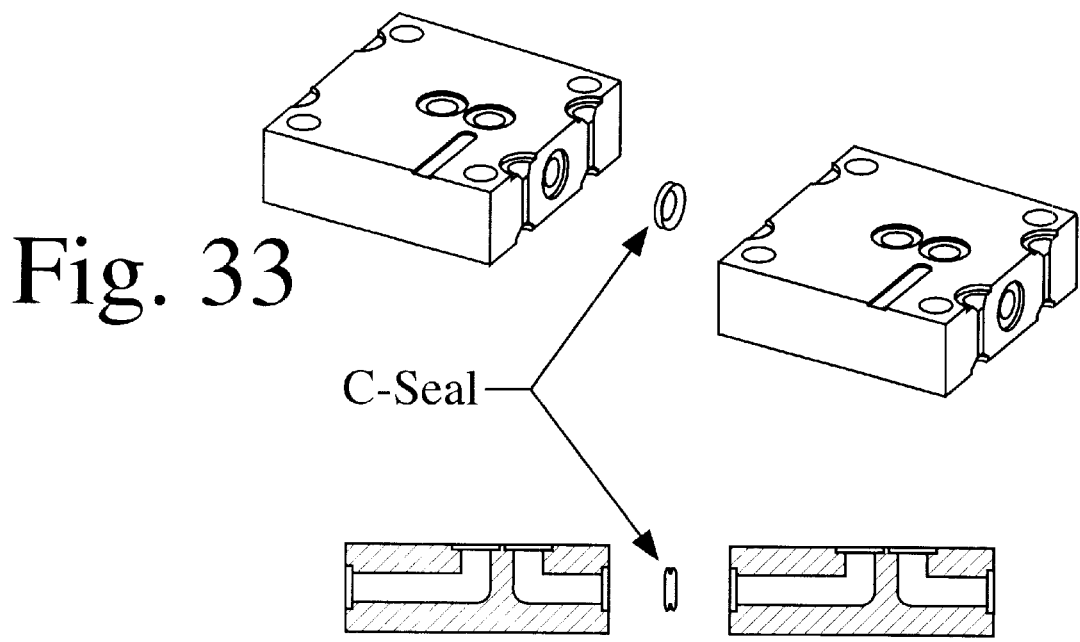
Figure 34:
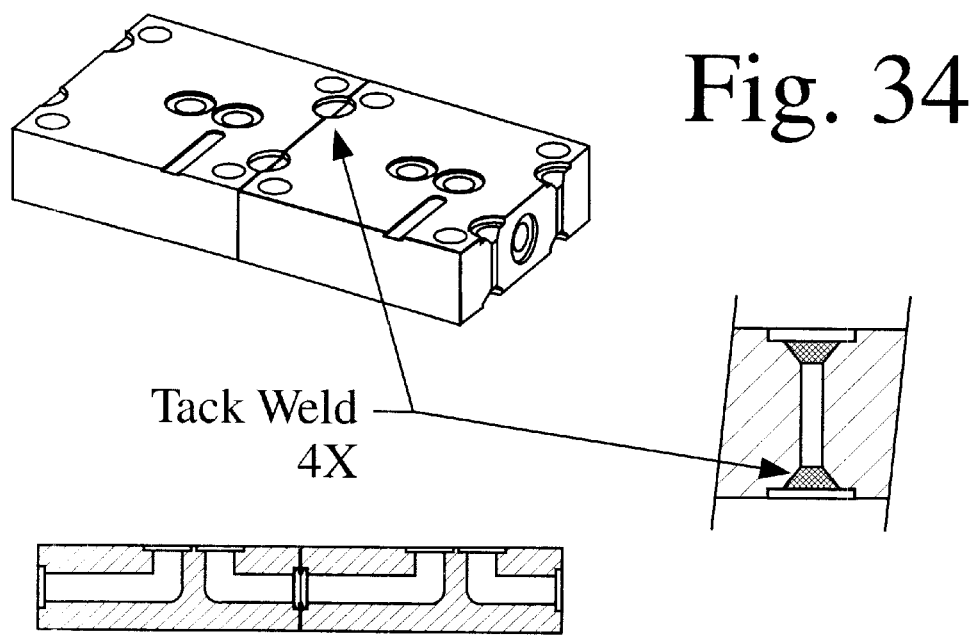

FIGS. 33 and 34 exhibit fusion weld joint design, and illustrate single-sided individual multi-port gas blocks.

A DETAILED DESCRIPTION OF PREFERRED & ALTERNATIVE EMBODIMENTS

I. A Preferred Embodiment of the Invention

Figures 1, 2:
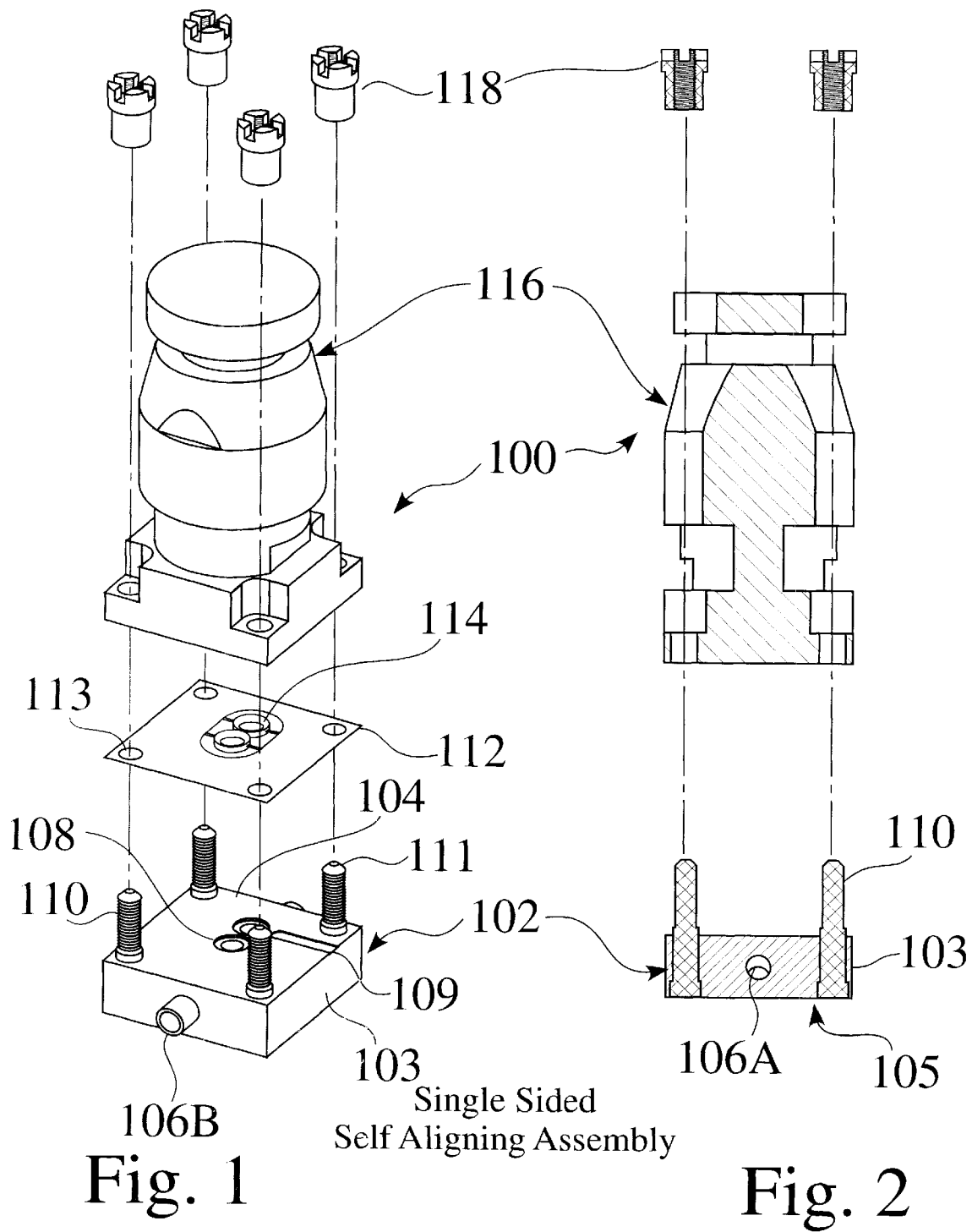

FIGS. 1 & 2 depict a preferred embodiment of the invention coupled to an external component. A Self-Aligning SmartStrate™ 100 is shown in both perspective and cut-away views. This embodiment comprises a generally rectilinear body 102 having four, generally parallel exterior side walls 103, an upper wall 104 and a lower wall 105. While the preferred embodiment is generally rectilinear, the body 102 may be formed in any shape or configuration. One or more of the exterior walls 103 may include a side wall port 106A or a weld extension 106B for making connections to external lines. In one embodiment of the invention, the miniaturized weld extension 106B is only 0.125 inches long. Both these ports and extensions 106 lead into the body 102, and may connect through an internal passageway 107 to a circular port 108 that may be located on an upper wall 104. This passageway 107 from the weld extension 106B to the port 108 enables a fluid to pass through the body 102 to an external component. In one embodiment of the invention, the top surface 104 of the body 102 includes a "sniffing hole" 109 which is used to detect leaks.

In a preferred embodiment, the body 102 also includes four self-aligning posts 110 that may be used to connect an external device, block or component 116 to the body 102. A thin-foil sheet or wafer 112 that includes alignment holes 113 and "C-seals" 114 is installed between the body 102 and the external device 116, which is held in place by a set of retainers 118 which are secured to the posts 110. These sheets 112 are well-known in the commercial marketplace, and are sold by EG&G of Beltsville, Md. under the trademarked name of "BETA-C™ Seal."

In a preferred embodiment of the invention, the pins 110 are integrally formed, machined or otherwise incorporated with the body 102, which eliminates the need for an end user to precisely align and then assemble the body 102 with an external set of fasteners. By obviating the need for assembly by the end user, the present invention provides an integrated coupler which virtually eliminates the risk of damage incurred by the end user due to a mis-aligned assembly or a scratched, scored or broken seal 114. The pins 110 also include tapered, rounded or conical ends 111 which enable the automatic alignment of the pins 110 with the sheet 112 and the external component 116. These projections 110 may be threaded or unthreaded, or may comprise a pin, post, stud or any other suitable protruding member that provides a means of connecting the body 102 to some other device, block or component. The retainers 118 may be a nut, cap or any other means which is capable of securing an external component to the body 102.

The foil sheet 112 which holds the seals 114 in place provides for the automatic registration and alignment of the body 102 and the external component. The seal 114 is properly aligned when the seal is positioned over the posts. The seal is then urged down onto the body, with the posts inserted through the four alignment holes in the corner of the seal. This correct alignment does not depend on the skill of the assembler, since no separate screws are required to manually couple the body 102 to an external component. The integrity of the seal 114 and the physical connection between the body 102 and the external component are assured by this self-aligning feature. The semiconductor industry, one of the largest users of the present invention, is extremely concerned about the integrity of this seal 114. Small radial scratches on the surface of the seal 114 could compromise the ability of the seal to prevent leaks. Any rough handling or abrasion of the seal could result in a scratch which ruins the coupling between the body 102 and the external component 116.

The self-alignment pins 110 offer several benefits. The posts or pins 110:

Permit visual positioning of the foil sheet 112 or the positioning of individual seals 114;

Insure the precise alignment of the external surface mount component over the seals 114;

Eliminate the potential for damage to the seal 114 due to an assembly error by preventing the seal from being scratched at the point of engagement with the pins;

Capture the external surface mount component and align it before the external component comes into contact with the seals 114; and Provide, in one embodiment, a 0.210 diameter engagement with the external component.

The pins 110 that are incorporated into single sided substrates may employ slightly larger "bottom-end" diameters for those who prefer additional security.

Once the external component is placed on the body, it is restrained from lateral or rotational movement. At this point, the nuts may be readily engaged with the pins. The nut design is very simple, and can be modified to suit any external component. The wrenching configuration is also readily changed. In a preferred embodiment, No. 10-32 nuts are used, but other nut sizes may be employed. The motivation for this self-aligning feature is to provide quality assurance, along with simplicity in installation.

The present invention may be utilized or combined with virtually any suitable external component which may or may not be a surface mount component. Examples of an external component include a manual valve, a pneumatic valve, a solenoid valve, a pressure regulator, a pressure transducer, a filter, a purifier or a mass flow controller. In most cases, the external component that is used with the present invention is characterized by dimensions which are standardized. In some circumstances, the body 102 may act as a heat sink during welding. In accordance with the invention, the combined body 102 and external component are generally leakproof means for providing a high purity conveyance for fluids. In a preferred embodiment, the present invention is configured to be compatible with SEMI-standard formats. In some embodiments of the invention, the weld extension (106B) provides a generally shorter wetting surface for welding when compared to conventional fittings. The extension may also be welded may be welded using automated equipment.

II. Alternative Embodiments of the Invention

In an alternative embodiment of the invention, the retainer 118 may comprise a torque ring. This torque ring is a generally annular, metal ring or torus which includes a set of holes formed in the bottom of the ring. The ring has one hole for each alignment post 110. One portion of each of these holes is relatively large, and is configured to receive and accommodate the end of an alignment post 110. Another portion of each hole has a narrowed dimension. After the ring is lowered over the external component, the posts 110 are inserted into the holes in the bottom of the ring. The ring is then rotated or torqued about its center, causing the narrowed portion of the holes in the ring to engage each post, and the ring tightens or locks the body 102 and the external component together.

In yet another embodiment of the invention, the alignment posts 110 are modified to include grooves 115 which are capable of retaining a wafer 112 bearing a seal 114. This embodiment allows the fluid coupler to be shipped to a customer or end-user with the seal 114 already corrected installed on the top wall 104 of the body 102 of the fluid coupler.

Figures 3, 4:
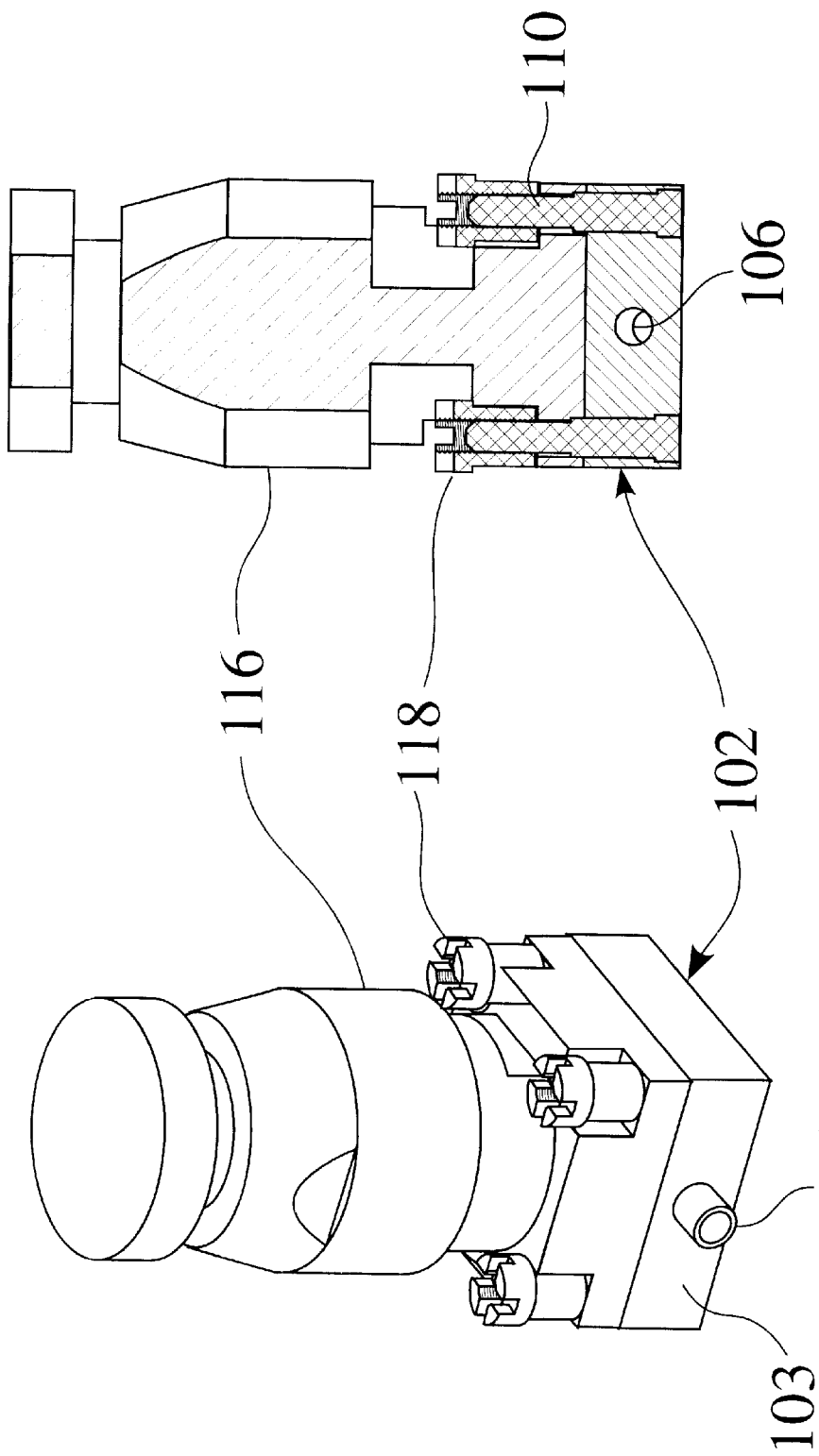

FIGS. 3 & 4 present perspective and cut-away views of the assembled self-aligning substrate shown in FIGS. 1 & 2.

FIGS. 5 & 6 present exploded side and cut-away views of one embodiment of a double-sided self-aligning substrate.

Figure 8:
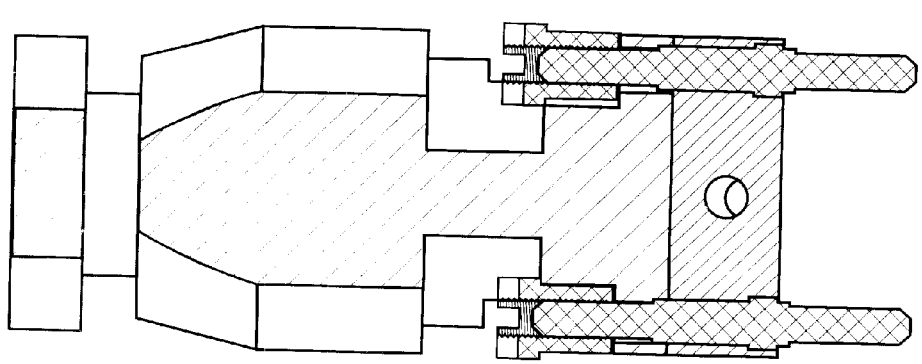
Figure 7:
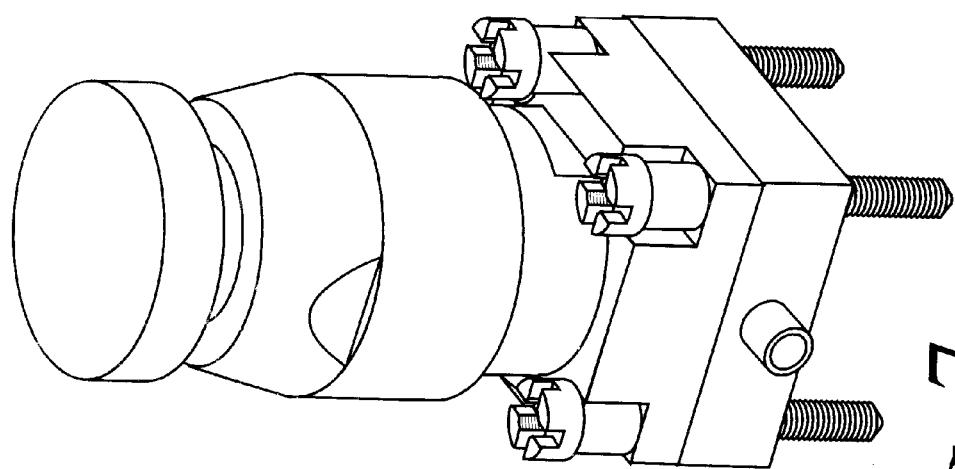

FIGS. 7 & 8 present perspective and cut-away views of the assembled self-aligning substrate shown in FIGS. 5 & 6.

Figure 9:
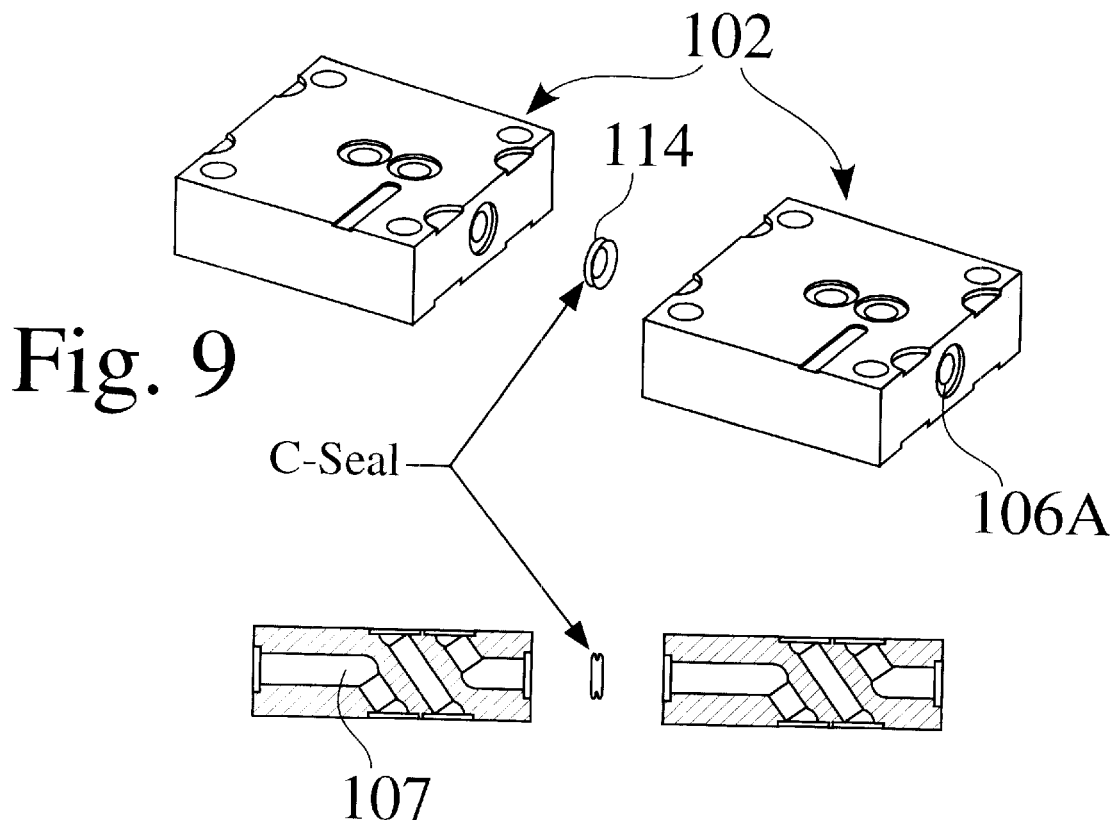
FIGS. 9 & 10 depict perspective and cut-away views of one embodiment of double-sided multi-port gas blocks.
Figure 10:
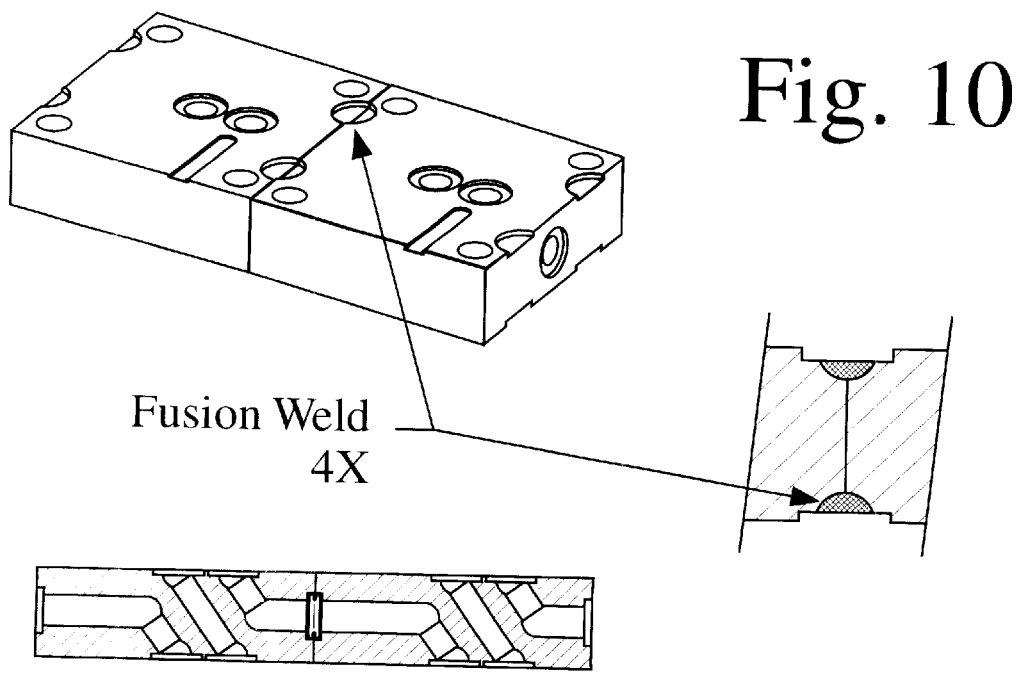

FIGS. 9 & 10 depict perspective and cut-away views of one embodiment of double-sided multi-port gas blocks. FIG. 9 reveals an internal passageway 107.

Figure 11A:
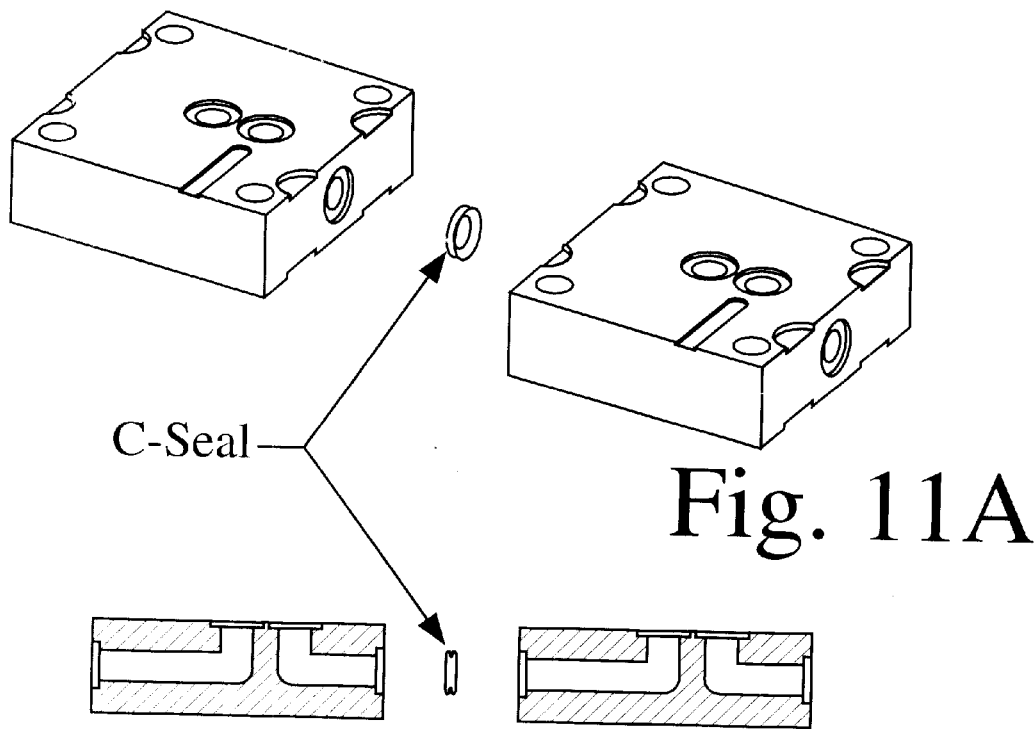
FIGS. 11A & 11B depict perspective and cut-away views of one embodiment of single-sided multi-port gas blocks.
Figure 11B:
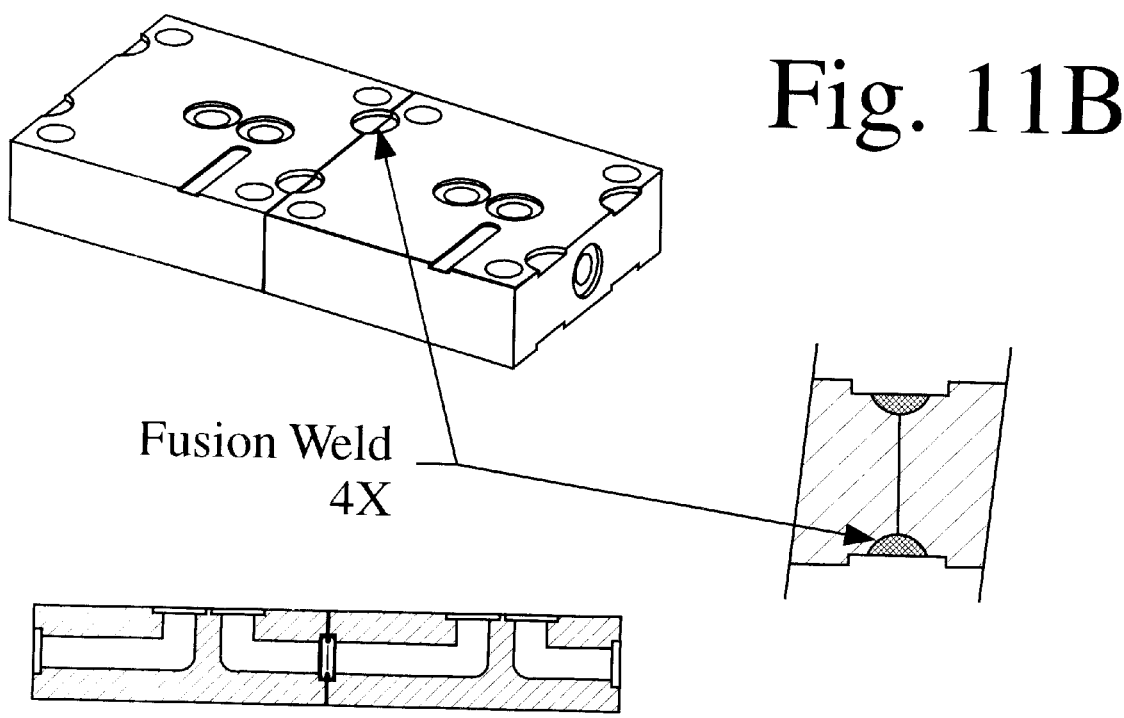

FIGS. 11A & 11B depict perspective and cut-away views of one embodiment of single-sided multi-port gas blocks.

FIGS. 12A & 12B offer views a gas manifold that includes single sided multi-ported gas blocks.

FIGS. 13 & 14 illustrate single-sided self-alignment and fastening pin and nut.

FIGS. 15 & 16 illustrate double-sided self-alignment and fastening pins.

FIGS. 17A, 17B, 18A & 18B portray perspective and cut-away views of fluid couplers.

FIGS. 19A, 19B, 20 & 21 depict embodiments of the invention that utilize a self-aligning studs. This welding takes the place of the welded tube stub. The spot welding fuses the blocks together, and they can be separated by "machining out" the spot weld.

FIG. 22 presents perspective and cut-away views of one embodiment of the present invention.

FIG. 23 provides overhead and cut-away views of weld nuggets that are employed to join individual blocks.

FIGS. 24 and 25 offer perspective and cut-away views of a mono-block self-aligning assembly.

FIG. 26 furnishes several views of a double-sided self-aligning gas block.

FIGS. 27, 28 and 29 furnish several views of a single-sided self-aligning gas block.

FIG. 30 supplies additional views of a double-sided self-aligning gas block.

FIG. 31 depicts an array of single-sided self-aligning gas blocks.

FIG. 32 portrays a double-sided self-aligning gas block.

FIGS. 33 and 34 exhibit fusion weld joint design, and illustrate single-sided individual multi-port gas blocks.

III. Fusion Weld Joint Design for Joining Individual Surface Mount Components

The seal is placed between the adjoining individual blocks. The individual blocks are abutted firmly, and the fusion welds are made in a desired sequence. This substrate design eliminates the costly tube stub stick-out, and more closely resembles a simple machined individual block. This substrate design employs fusion spot welds to secure the individual blocks together instead of the #10-32 socket head cap screws. The shrinkage of the fusion welds causes the weld to maintain a compression on the facing surfaces of the individual blocks. Shrinkage of the weld casting, which approximates 0.025 inches per inch, will in this case reasonably result in a 0.004 inch preload on the facing surfaces. The axial load on the substrate will be in the 500 to 1000 pound range. This preload well be maintained, since the restrained weld nugget will go into tension as the casting solidifies. The weld design will hold the substrate components in perfect alignment and also prevent any relative movement thereon. In this design non-orbital welds replace the screwed together configuration. The individual block design may be used as a tee, elbow or a cross results in a smaller foot print and less cost and provides a unique design versatility.

IV. Additional Benefits of the Invention

The present invention provides a welding block that insures straight, reliable welds. The innovative design eliminates most mechanical seals. In an alternative embodiment of the invention, a novel weld head is used to join the present invention to external tubes. This weld head permits 1/16 or 1/8 inch stick-outs instead of conventional 1/4 inch stick-outs, which reduces the required wetted surface area. Reducing the stick-out length is important, because the strength of any assembly of welding blocks is increased, and precious space is saved. In a preferred embodiment of the invention, the couplers are double contained to ensure against the venting of dangerous gases. The present invention offers enhanced design flexibility, simplicity of manufacture, and is lighter and less costly that its conventional counterparts.

The surface-mount, modular design of the present inventions offers several important advantages. The footprint of the coupler is minimized. The mounting holes allow the coupler to be bolted to a substrate, which ensures a sturdy, reliable connection. Only one tool is needed to remove and replace the coupler. The design is extremely flexible, and offers a decreased wetted surface compared to conventional hardware. One preferred embodiment of the invention comprises a 1.5"×1.5"×0.5" base block with 1/4" tube stubs machined to Semiconductor Specification No. 2787.1.

The overall cost of the present invention is far less than competing systems. Blocks are smaller, lighter and simpler to machine. Greater design flexibility is achieved by sharing a common footprint. The gas flow path resides in the same plane. An all welded substrate generally reduces potential leaks. An all-welded substrate generally reduces undesirable crevices and turbulence in the flow path by eliminating mechanical seals. Components can be mounted on one or both sides of the block. Tube stub lengths can, for example, be 0.0625", 0.125" or 0.188", compared to a conventional length of 0.250". Extra material may be added to the tube stubs to compensate for weld shrinkage. The couplers can handle oversized components without the addition spacers. The couplers can act as elbows, tees and crosses. For dangerous gases, a double contained joint design may be utilized.

The present invention may be mated to an external conduit. The mating end of the external conduit is seated snugly within the confines of the double contained extension 106B. This combination of lateral support with a sturdy foundation enables the invention to provide an extremely precise alignment of the external tube. The invention helps to avoid gaps called voids. Voids are created if the welding process does not achieve a complete fusing of the parent metals. These irregularities constitute a serious nuisance, since they can contribute to the eventual failure of the seal and can harbor tiny particles of dust that may later contaminate the system.

The present invention is not limited to rectilinear or cubical configurations. Alternative embodiments may incorporate virtually any number of ports oriented in any direction. Using a versatile selection of cubical, spherical, or other custom shaped bodies, an immense variety of fluid couplers that combine many different kinds of conduits may be constructed.

Unlike prior fittings, the present invention is an integral machined instrument. This advanced design overcomes the major disadvantages of welding together two abutting circular surfaces, such as a fitting branch and a hollow tube, that must somehow be clamped together or held in proper alignment by a jig or vise. The counterbore step eliminates this alignment and assembly problem completely by providing a snug physical connection before the hardware is welded. The present invention is specifically engineered for high quality systems where precise dimensional control is absolutely essential. The present invention does not pertain to large rough fixtures like tees or elbows for home plumbing, oil pipelines, or sewer pipes.

The present invention is not a welded fitting, since it incorporates no welded seams or joints. By avoiding the use of welded seams or joints within it, the present invention can offer levels of reliability and performance that are far superior to those of conventional welded or bolted fittings. In addition, the invention's solid design obviates the need for complicated or extensive machining, milling, or grinding procedures. Unlike older fittings, the elegantly simple process for joining the invention to a section of tubing does not involve complex axial, translational, orbital or rotary motion of a weld head or related equipment. By dispensing with previous arrangements of ridges, grooves, collars, flanges, recesses, slots, and threads, the present invention provides a superior product that costs less than the previous hardware that it will replace in the marketplace.

The welding methods that may be employed to connect the present invention to fluid lines or other fittings encompass the entire spectrum of modern welding techniques. Although the best mode of practicing the invention is generally arc welding with a miniature electrode, any suitable means of supplying intense heat to fuse the present invention to a desired device or surface would be effective. Some of the various techniques that are available for this purpose are laser, ultrasonic, or resistance welding. In some circumstances, brazing and soldering may also be selected.

The only limit on the scale reduction of the invention is the size of the welding electrode. At the present time, the inventors have produced SmartStrate™ fluid couplers measuring one eighth of an inch along an edge. Future microscopic fittings maybe connected to equally small fluid lines using semiconductor laser diodes as heat sources.

The SmartStrate™ coupler is so accurately configured and sized that it may be used for dimensional control and inspection of welded assemblies. Due to its revolutionary small footprint and displacement, this invention facilitates the construction of lightweight portable welding kits. A complete welding system or gas manifold may be placed within a standard gas cabinet in a clean room lab. Such a miniaturized welding system would be ideal for on-orbit applications aboard the Space Shuttle or Space Station. The invention may also be employed as the housing for a temperature, pressure, or flow-rate sensor that can be mated to fluid line that requires constant monitoring or adjustment. Aside from playing a major role in semiconductor industry, the invention will improve fluid-handling systems in aircraft and satellites. Future medical instruments and artificial organs may incorporate the present invention for the precise delivery of body fluids or life-saving drugs.

Although the present invention is intended for situations where it will be connected to other weldable metals such as steel, titanium, aluminum, copper, or brass. The methods and apparatus delineated in the Claims that follow may be incorporated in other non-metallic media such as plastics or ceramics.

The present invention represents a unique innovation that will be utilized in a wide variety of industrial and commercial settings that demand high quality, user worthy, precision systems.

CONCLUSION

Although the present invention has been described in detail with reference to a particular preferred embodiment, persons possessing ordinary skill in the art to which this invention pertains will appreciate that various modifications and enhancements may be made without departing from the spirit and scope of the Claims that follow. The various couplers that have been disclosed above are intended to educate the reader about various preferred and alternative embodiments, and are not intended to constrain the limits of the invention or the scope of the Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

100 Self-Aligning SmartStrate™
102 Rectilinear body
103 Exterior side wall
104 Exterior upper wall
105 Exterior lower wall
106A Side wall port
106B Side wall weld extension
107 Internal passageway
108 Port
109 Sniffing hole for detection of leaks
110 Self-aligning post
111 Conical or rounded ends of posts
112 Foil sheet
113 Alignment holes on foil sheet
114 C-Seals
116 External component
118 Retainers

What is claimed is:

1. An apparatus comprising:
   a body means (102) for conveying a fluid;
   a weld extension means (106B) for providing a welded connection to an external device;
   said weld extension (106) being affixed to said body means (102);
   said body means (102) including a port means (108) for providing a weldless connection to an external component;
   said port means (108) being formed in said body means (102);
   said body means (102) including an internal passageway means (107) for permitting said fluid to flow between said weld extension (106B) and said port means (108);
   said body means (102) further including a projection means (110) for connecting said body means (102) to an external device.

2. An apparatus as recited in claim 1, in which said body means (102) is made from metal.

3. An apparatus as recited in claim 1, in which said body means (102) is generally rectilinear.

4. An apparatus as recited in claim 1, in which said body means (102) includes a flat exterior side wall (103).

5. An apparatus as recited in claim 1, in which said body means (102) includes an upper external wall (104); and
   said port means (108) is generally located in said upper external wall (104).

6. An apparatus as recited in claim 1, in which a foil sheet (112) and a seal (114) are utilized to form a leak-proof connection between said body means (102) and an external device.

7. An apparatus as recited in claim 1, in which said body means (102) is double contained.

8. An apparatus as recited in claim 1, in which said external component is one of the following group: a manual valve, a pneumatic valve, a solenoid valve, a pressure regulator, a pressure transducer, a filter, a purifier or a mass flow controller.

9. An apparatus as recited in claim 1, in which said projection means (110) is a post.

10. An apparatus as recited in claim 1, in which said projection means (110) is a pin.

11. An apparatus as recited in claim 1, in which said projection means (110) is a stud.

12. An apparatus as recited in claim 1, in which said projection means (110) includes a rounded end (111).

13. An apparatus as recited in claim 1, further comprising:
    a retainer means (118) which engages said projection means (110) to secure said body means (102) to said external component.

14. An apparatus as recited in claim 1, in which said component is characterized by dimensions which are standardized.

15. An apparatus as recited in claim 1, in which said body means (102) act as a heat sink during welding.

16. An apparatus as recited in claim 1, in which said body means (102) and said external component are self-aligning due to the combined action of said projection means (118), said external component, and said retainer means (118).

17. An apparatus as recited in claim 1, in which said body means (102) and said component are generally leak-proof.

18. An apparatus as recited in claim 1, in which said body means (102) and said component provide a high purity conveyance for said fluid.

19. An apparatus as recited in claim 1, in which said body means (102) is configured to be compatible with SEMI-standard formats.

20. An apparatus as recited in claim 1, in which said weld extension means (106B) provides a generally shorter wetting surface for welding when compared to conventional fittings.

21. An apparatus as recited in claim 1, in which said weld extension means (106B) may be welded using automated equipment.

22. An apparatus as recited in claim 1, in which said external component is a surface mount component.

23. An apparatus as recited in claim 1, in which said weld extension (106B) is only about 1/16 of an inch in length.

24. An apparatus comprising:
    a generally rectilinear body (102);
    said generally rectilinear body (102) having a plurality of exterior side walls (103);
    one of said plurality of exterior walls (103) having a weld extension (106B); said weld extension (106B) being affixed to said generally rectilinear body (102) on one of said exterior side walls (103); said weld extension (106B) being capable of being welded to an external tube; and
    a sheet (112); said sheet (112) including a seal (114) and a plurality of alignment holes (113);

one of said plurality of exterior walls (103) having a port (108); said port (108) being configured to mate with an external component together with said seal (114) surrounded by said sheet (112);

said generally rectilinear body (102) having an internal passageway (107); said internal channel (107) being in communication with said weld extension (106B); said internal channel (107) being in communication with said port (108);

said generally rectilinear body (102) also having a plurality of posts (110) for automatically aligning and connecting said external component with said body (102); said posts (110) including a conical end (111).

25. A method comprising the steps of:

providing a generally rectilinear body (102); said generally rectilinear body (102) having a plurality of exterior side walls (103);

forming a port (108) in said body (102);

forming a weld extension (106B) which extends from said body (102);

forming a plurality of posts (110) on said body (102);

providing a sheet (112) having a plurality of alignment holes (113) and a seal (114);

attaching an external component to said generally rectilinear body (102) by aligning said plurality of posts (110) with said plurality of alignment holes (113) in said sheet (112), and then engaging said plurality of posts (110) with an external component;

conveying said fluid through said generally rectilinear body (102) through an internal passageway (107); said internal channel (107) being in communication with said weld extension (106B); said internal channel (107) also being in communication with said port (108);

affixing said external fixture to said generally rectilinear body (102) using said plurality of posts (110).

* * * * *